US011900548B2

(12) United States Patent
Marsh et al.

(10) Patent No.: US 11,900,548 B2
(45) Date of Patent: *Feb. 13, 2024

(54) AUGMENTED VIRTUAL REALITY OBJECT CREATION

(71) Applicant: Flow Immersive, Inc., Auburn, CA (US)

(72) Inventors: Jason Marsh, Auburn, CA (US); Aleksei Karpov, Orenburg (RU); Timofey Biryukov, Almaty (KZ)

(73) Assignee: Flow Immersive, Inc., Auburn, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,894

(22) Filed: Sep. 13, 2021

(65) Prior Publication Data

US 2022/0114793 A1   Apr. 14, 2022

Related U.S. Application Data

(63) Continuation of application No. 16/878,480, filed on May 19, 2020, now Pat. No. 11,145,134, which is a continuation of application No. 16/108,065, filed on Aug. 21, 2018, now Pat. No. 10,657,725.

(60) Provisional application No. 62/548,114, filed on Aug. 21, 2017.

(51) Int. Cl.
*G06T 19/00* (2011.01)
*A63F 13/00* (2014.01)
*G06T 19/20* (2011.01)

(52) U.S. Cl.
CPC ............ *G06T 19/006* (2013.01); *A63F 13/00* (2013.01); *G06T 19/20* (2013.01); *G06T 2210/61* (2013.01); *G06T 2219/024* (2013.01); *G06T 2219/2004* (2013.01)

(58) Field of Classification Search
None
See application file for complete search history.

(56) References Cited

U.S. PATENT DOCUMENTS

| 2005/0206654 A1 | 9/2005 | Vaha-Sipila |
| 2014/0225914 A1 | 8/2014 | Kasahara et al. |
| 2014/0344762 A1 | 11/2014 | Grasset et al. |
| 2015/0040074 A1 | 2/2015 | Hofmann et al. |

OTHER PUBLICATIONS

International Application No. PCT/US2018/047399, International Search Report and Written Opinion dated Dec. 13, earn.

*Primary Examiner* — Robert J Craddock
(74) *Attorney, Agent, or Firm* — Ahmann Kloke LLP

(57) ABSTRACT

A system includes an augmented virtual reality (AVR) object creation engine, an AVR object enhancement engine, an AVR object positioning engine, and an AVR media authoring engine. The AVR object creation engine is configured to convert real world data into one or more AVR objects. The AVR object enhancement engine is configured to enhance the one or more AVR objects to include at least one of processed data visualization and multiuser controls. The AVR object positioning engine is configured to position the enhanced one or more AVR objects in a virtual space-time. The AVR media authoring engine is configured to make available, as AVR media, a scene tree including the virtual space-time in which the enhanced one or more AVR objects are positioned.

20 Claims, 13 Drawing Sheets

AUGMENTED VIRTUAL REALITY OBJECT CREATION

CROSS-REFERENCE TO RELATED APPLICATIONS

The present application is a continuation of U.S. patent application Ser. No. 16/108,065 filed Aug. 21, 2018, now U.S. Pat. Ser. No. 10/657,725, which claims priority to U.S. Provisional Patent Application Ser. No. 62/548,114 filed Aug., 21, 2017, which are incorporated herein by reference.

DETAILED DESCRIPTION

Figure 1:
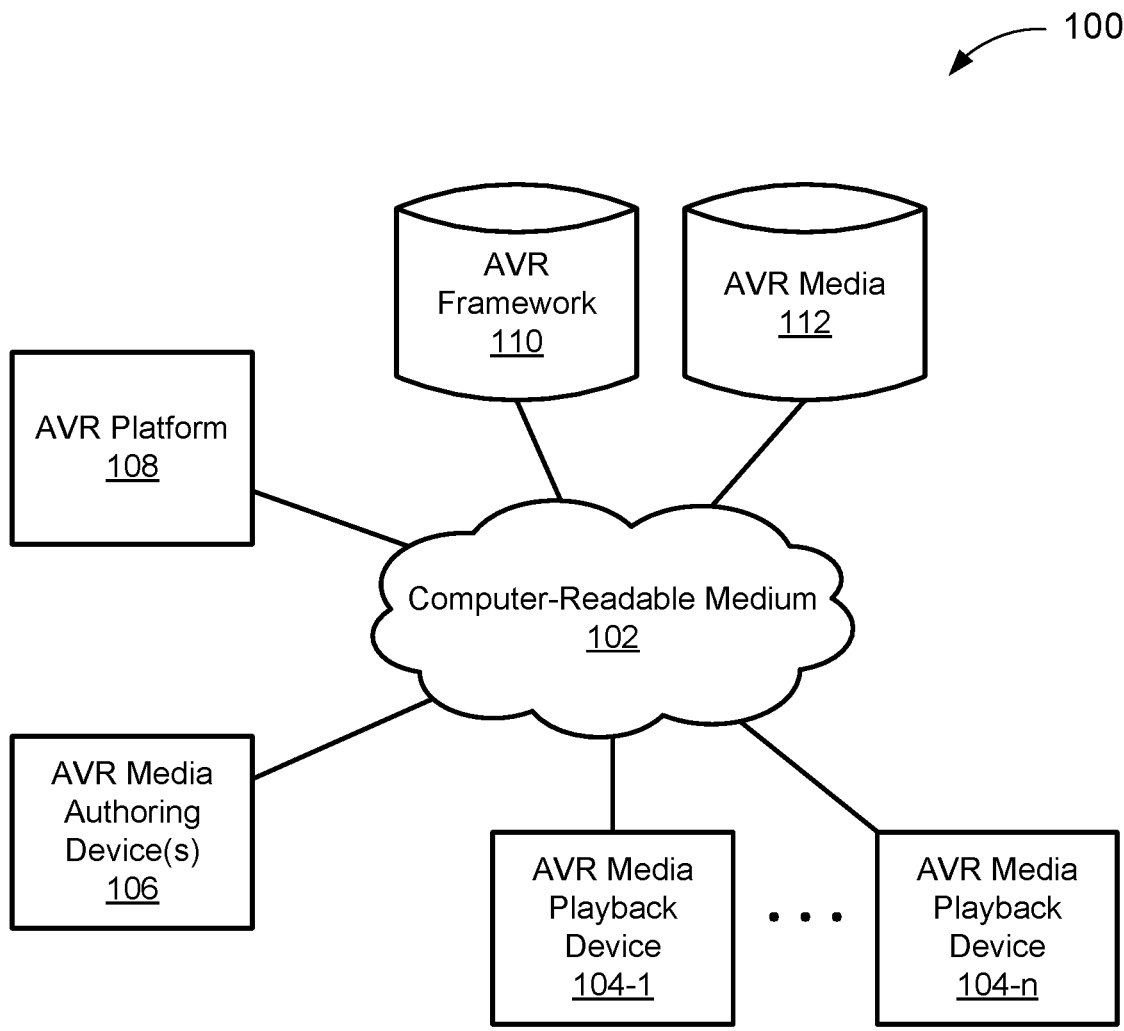
FIG. 1 depicts a diagram of an example of an augmented virtual reality (AVR) system.

FIG. 1 depicts a diagram 100 of an example of an augmented virtual reality (AVR) system. The diagram 100 includes a computer-readable medium (CRM) 102, one or more AVR media playback devices 104-1 to 104-n (referred to collectively as "AVR media playback devices 104") coupled to the CRM 102, one or more AVR media authoring device(s) 106 coupled to the CRM 102, an AVR platform 108 coupled to the CRM 102, an AVR framework datastore 110 coupled to the CRM 102, and an AVR media datastore 112 coupled to the CRM 102.

The CRM 102 and other CRMs discussed in this paper are intended to include all mediums that are statutory (e.g., in the United States, under 35 U.S.C. 101), and to specifically exclude all mediums that are non-statutory in nature to the extent that the exclusion is necessary for a claim that includes the CRM to be valid. Known statutory CRMs include hardware (e.g., registers, random access memory (RAM), non-volatile (NV) storage, to name a few), but may or may not be limited to hardware.

The CRM 102 and other computer readable mediums discussed in this paper are intended to represent a variety of potentially applicable technologies. For example, the CRM 102 can be used to form a network or part of a network. Where two components are co-located on a device, the CRM 102 can include a bus or other data conduit or plane. Depending upon implementation-specific or other considerations, the CRM 102 can include wired communication interfaces and wireless communication interfaces for communicating over wired or wireless communication channels. Where a first component is located on a first device and a second component is located on a second (different) device, the CRM 102 can include a wireless or wired back-end network or LAN. The CRM 102 can also encompass a relevant portion of a WAN or other network, if applicable. Enterprise networks can include geographically distributed LANs coupled across WAN segments. For example, a distributed enterprise network can include multiple LANs (each LAN is sometimes referred to as a Basic Service Set (BSS) in IEEE 802.11 parlance, though no explicit requirement is suggested here) separated by WAN segments. An enterprise network can also use VLAN tunneling (the connected LANs are sometimes referred to as an Extended Service Set (ESS) in IEEE 802.11 parlance, though no explicit requirement is suggested here). Depending upon implementation or other considerations, the CRM 102 can include a private cloud under the control of an enterprise or third party, or a public cloud.

The devices, systems, and CRMs described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a CRM for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical CRM on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 1, the AVR media playback devices 104 are intended to represent devices with wired or wireless interfaces through which the AVR media playback devices 104 can send and receive data over the CRM 102. Examples of AVR media playback devices 104 are desktop computers, laptop computers, tablet computers, wireless devices (such as cellular phones, smartphones, or the like), or wearable devices, to name several. The AVR media playback devices 104 can include a browser and a headset, but techniques for transforming a smartphone into a 3D viewer are known (e.g., using Google Cardboard), which enables a person to enjoy AVR media playback with a single assembled device. In a specific implementation, AVR media can be rendered for a display that does not have AVR media playback, such as a flat laptop screen, which may be useful for debugging, including audience members who lack optimal tools in a presentation, or other purposes; the full impact of the AVR experience currently requires some type of head (and/or eye) tracking mechanism, though neural interfaces could conceivably replace physical head (and/or eye) movement tracking. A multimedia experience entails the use of both video and audio, so the AVR media playback devices 104 may also be equipped with headphones, earbuds, speakers, or other device for providing audio to a person enjoying an AVR media playback experience. In a specific implementation, at least one of the AVR media playback devices 104 has an application installed for enabling an AVR mode.

In a specific implementation, the AVR media playback devices 104 include unique identifiers which can be used in the transmission of data through a network. Unique identifiers of the AVR media playback devices 104 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. Depending upon implementation-specific or other considerations, the AVR media playback devices 104 can include applicable communication interfaces for receiving and sending data according to an applicable wireless device protocol. Examples of applicable wireless device protocols include Wi-Fi, ZigBee®, Bluetooth®, and other applicable low-power communication standards.

In a specific implementation, the AVR media playback devices 104 act as stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the AVR media playback devices 104 are configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

A human agent authoring AVR media need not be tied to a single device and can make use of different devices at different times (e.g., a desktop at home, a laptop at work, a smartphone on the train, different workstations, etc.). The one or more AVR media authoring device(s) 106 illustrated in diagram 100 are intended to represent any and all such devices for illustrative convenience. In a specific implementation, one or more of the AVR media authoring device(s) 106 can also function as AVR media playback devices, as well, either by implementation or configuration.

The AVR platform 108 illustrated in diagram 100 is intended to represent a platform that facilitates the authoring of AVR media and the distribution of the AVR media for playback. AVR enables an author to capture the advantages of immersion, which is best in virtual reality (VR), with the advantages of collaboration, which is best in augmented reality (AR). Mechanisms to invest an audience in an experience include appealing to emotion through the use of 360° videos (enabling an audience to visualize another person's experience), appealing to intellect (through the use of processed data visualization, described later), providing a sense of mastery and control (through interactivity and subjective coordinates, described later), providing personalization (through on-the-fly timeliness and per-audience-member customization, described later), improving collaboration (through improved multiuser control and sharing, described later), and providing surprise (also known as "the reveal"). Appealing to emotion and intellect is enabled by the discovery AVR symbol objects are processed through the hippocampus to provide an emotional impact much like physical, VR objects, or AVR media objects are processed through the hippocampus, causing humans to naturally link emotion and intellect in an AVR environment that includes both AVR symbol and AVR media objects, which are described in more detail later. The combination of interactivity, personalization, and improved collaboration results in the most sharable VR platform on the planet, which is explored in greater detail later. As discussed further below, AVR works well in a mixed reality context, which entails transitioning from AVR to AR or from AR to AVR. Although conventional mixed reality may be associated with transitioning between AR and VR, transitioning between AR and VR is not explicitly explored in this paper, but techniques described in this paper may be used to improve conventional mixed reality. In a specific implementation, the AVR platform 108 is implemented using a software-as-a-service (SAAS) model with tools accessible via a web browser.

The AVR platform 108 can support a flow ecosystem that includes micropayments. In a specific implementation, the AVR platform 108 determines how much compensation a contributing entity deserves, including a first entity that provides a template that is later modified to include all new data by one or more second entities. Blockchain, tangle, and similar technologies can provide a proof of provenance for such a system. It is possible to go back to an original or any version from the original to date to identify changes and attribute the changes to relevant entities. The ownership proportion can be characterized with a token (e.g., a FLOWKEN™) or using reputation (e.g., Karma) that allows upvoting to improve reputation. Instead or in addition, downvotes can decrease reputation (or increase reputation using the theory any interest is good interest). Alternatively or in addition, time spent in a flow can improve reputation. In a specific implementation, there are different karmic tracks for functionality (e.g., structure), information (e.g., news), and/or creative expression (e.g., art). In some implementations, it may be desirable to include some form of conceptual (or physical) centralization, such as to keep blockchain addresses in a database that can be used to extinguish bad blockchains (e.g., child pornography) or only allow encrypted content to be unencrypted if requirements are met. An advantage of blockchain is proof of provenance cannot be altered, though some implementations are unwieldy (e.g., Etherium provides proof of provenance, but it is too expensive to use microtransactions with Etherium). In a specific implementation, Plasma is used to group microtransactions and perform group microtransactions in batch mode. Additional detail regarding AVR platforms is provided later.

The AVR framework datastore 110 illustrated in diagram 100 is intended to represent tools for the authoring of AVR media. The AVR framework datastore 110 may or may not be under the control of the same entity as the AVR platform 108. For example, a third party could make the AVR framework datastore 110 accessible to the AVR platform 108, in whole or in part. In a specific implementation, the AVR framework datastore 110 includes data structures in a JSON format. Additional detail regarding the AVR framework datastore 110 is provided later.

The AVR media datastore 112 illustrated in diagram 100 is intended to represent a store of authored AVR media. The AVR media datastore 112 may or may not be under the control of the same entity as the AVR platform 108. For example, AVR media could be stored, in whole or in part, on a third party AVR media datastore 112 or under the control of the same entity as one or more of the AVR media authoring device(s) 106 (potentially including storage local to one of the AVR media authoring device(s) 106). In a specific implementation, the AVR media datastore 112 is accessed by the AVR media playback devices 104 for playback on the devices.

An example of an AVR media data structure is a text sculpture. A text sculpture can comprise a relatively large number of characters (e.g., up to 250,000 characters and likely up to 450,000 characters with a working prototype that can run on a smart phone). The text sculpture can be characterized as big data with text instead of dots, where bigger text, font, color, or the like provides meaning. An underlying (anti-aliasing) shader removes text that is "far away" relatively quickly to make the text sculpture more readable. In a specific implementation, each letter is four points (x, y, z) x4 and each block is a combination of characters that can be added into a single, e.g., 3D geometry. A geometry includes an array of all of the vertices in which each character can be moved independently. Additional detail regarding the AVR media is provided later.

In an example of operation, a system such as is illustrated in FIG. 1 operates as follows. The AVR media authoring device(s) 106 are used by an author, which can include one or more human or artificial agents, to access the AVR platform 108 to interact with AVR media. Interaction with AVR media can entail creation, reading, updating, or deleting (CRUD) of new or existing AVR media, including merging non-collaborative and/or non-VR media components with AVR media components. The AVR platform 108 provides access to AVR framework data structures of the AVR framework datastore 110 for use by the AVR media authoring device(s) 106 to CRUD AVR media. Additional tools, not shown in diagram 100, can include tools that enable a human to more readily CRUD AVR media. The AVR platform 108 enables the AVR media authoring device(s) 106 to store CRUD AVR media in the AVR media datastore 112. For illustrative purposes, it is assumed the AVR media playback devices 104 are authorized to access AVR media from the AVR media datastore 112, which, in operation, they do, enabling playback on the AVR media playback devices 104.

Figure 2:
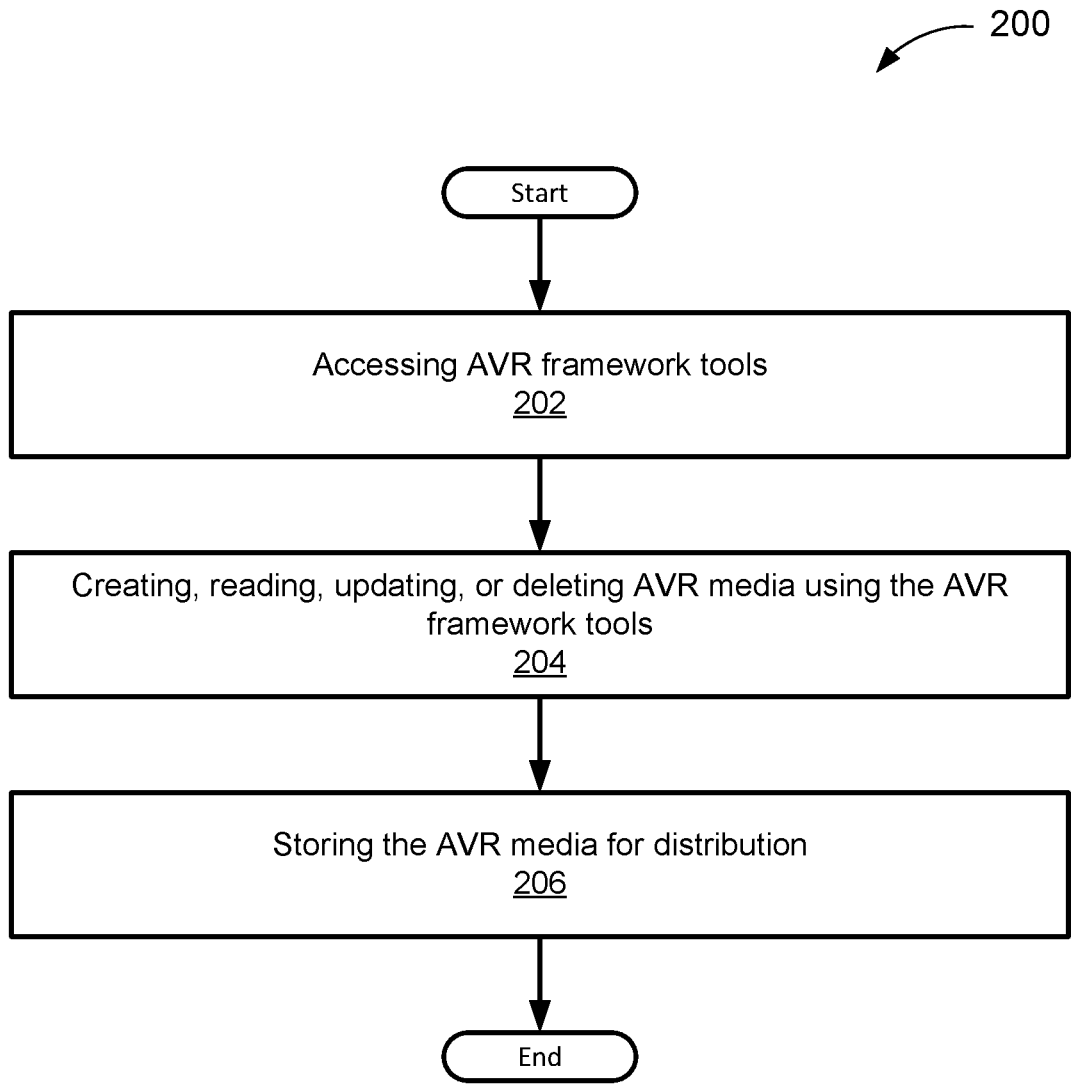
FIG. 2 depicts a flowchart of an example of a method for authoring and distributing AVR media.

FIG. 2 depicts a flowchart 200 of an example of a method for authoring and distributing AVR media. This flowchart and other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit. The flowchart 200 starts at module 202, with accessing AVR framework tools.

In the example of FIG. 2, the flowchart 200 continues to module 204 with CRUDing AVR media using the AVR framework tools. In a specific implementation, a human agent (typically the owner) of an AVR media authoring device inputs commands into the AVR media authoring device. Because artificial agents carry out the commands to CRUD AVR media, artificial agents actual perform the authoring operation, though colloquially the human agent would be characterized as the author. In some instances, however, a CRUD decision could be initiated and carried out entirely by artificial agents.

In the example of FIG. 2, the flowchart ends at module 206 with storing the AVR media for distribution. Advantageously, for reasons that will be explored in more detail later, AVR media distribution justifies using the marketing tagline "AVR is the most sharable VR platform on the planet."

Figure 3:
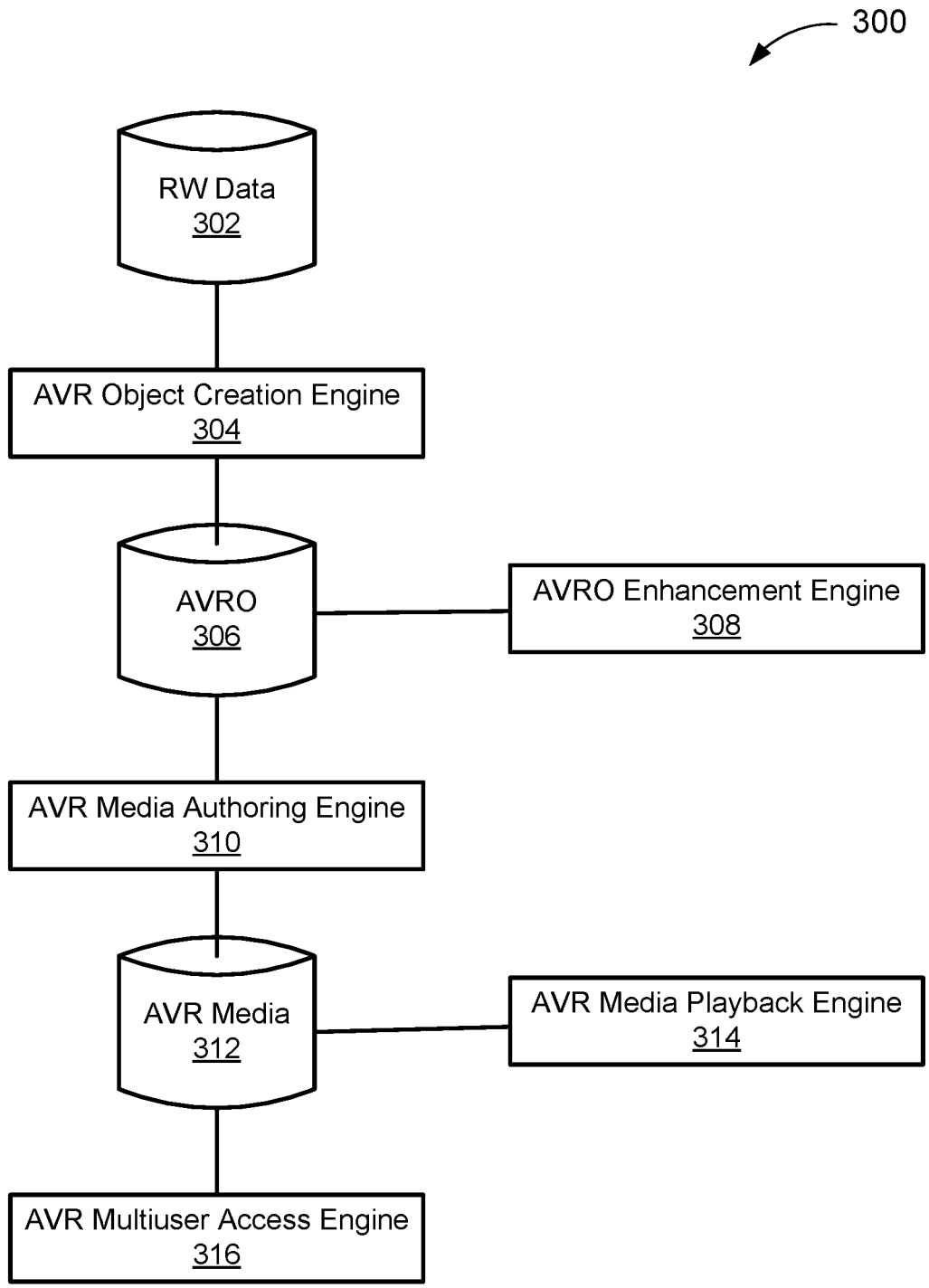
FIG. 3 depicts a diagram of an example of an AVR platform.

FIG. 3 depicts a diagram 300 of an example of an AVR platform. The diagram 300 includes a real world datastore 302, an AVR object creation engine 304, an AVR object datastore 306, an AVR object enhancement engine 308, an AVR media authoring engine 310, an AVR media datastore 312, an AVR media playback engine 314, and an AVR multiuser access engine 316. In the diagram 300, the real world datastore 302 is coupled to the AVR object creation engine 304; the AVR object datastore 306 is coupled to the AVR object creation engine 304, the AVR object enhancement engine 308, and the AVR media authoring engine 310; and the AVR media datastore 312 is coupled to the AVR media authoring engine 310, the AVR media playback engine 314, and the AVR multiuser access engine 316.

In the example of FIG. 3, the real world data datastore 302 is intended to represent data in any format that the AVR object creation engine 304 is capable of converting to an AVR compatible format. The formats in which the data can be represented include text files, word processing documents, spreadsheets, presentations, drawings, pictures, videos, and audio files to name several, but specific formats will be largely implementation-specific, depending upon what capabilities are provided to the AVR object creation engine 304 or other application capable of transforming data into a format the AVR object creation engine 304 can understand. The formats can include application-independent formats and application-dependent formats.

The real world data datastore 302 is intended to represent a potentially distributed datastore that can include, by way of example but not limitation, social feeds, news, websites, maps, or the like. In some instances, data can be geolocated and/or timestamped, or provide other metadata that can be exploited by the AVR object creation engine 304 (or other engines) if appropriately designed or configured to exploit some or all of the metadata associated with a particular data item. Capturing the metadata facilitates personalization of AVR media for individuals by geography (using geolocated data or mechanisms for determining an associated location) and timeliness (using timestamped or mechanisms for determining an associated time). If demographic, psychographic, or behavioristic characteristics of an AVR media audience can be determined or guessed, metadata can potentially be used to further improve the personalization of AVR media to the audience.

In the example of FIG. 3, the AVR object creation engine 304 is intended to represent specifically-purposed hardware that converts real world data from the real world data datastore 302 into AVR objects. In a specific implementation, the AVR object creation engine 304 models simplified objects in order to reduce delays during rendering, but complexity can be increased for systems capable of rendering objects with greater complexity. For illustrative convenience, it is assumed each AVR object includes a geometry and a material that, together define an object mesh. In a specific implementation, the geometry comprises triangles, but objects that are not 3D need not have a geometry, as defined here. Where a distinction is desired, objects can be referred to as AVR 3D objects and other AVR objects. In a specific implementation, the material comprises color, texture, and translucency components. Depending upon implementation- and/or configuration-specific factors, a material can be completely transparent, which can have an impact on the apparent location of other objects around the geometry of the transparent object and, if the object is interactive, provide an interactive element that is not a graphical element. An example of an AVR object modeling engine, such as the AVR object creation engine 304, is described in more detail later.

In the example of FIG. 3, the AVR object datastore 306 is intended to represent data structures output by the AVR object creation engine 304. The data structures can include AVR object components, which may or may not include all characteristics necessary to characterize a given data structure as an AVR object, but can be combined with other components, or otherwise used, to facilitate modeling of AVR objects. For illustrative purposes, it is assumed the AVR object creation engine 304 provides the data structures stored in the AVR object datastore 306, but it should be understood AVR object components can come from a variety of sources, including an initial library with a plurality of components and/or objects, from individuals or entities willing to share their data, or other sources.

In the example of FIG. 3, the AVR object enhancement engine 308 is intended to represent specifically-purposed hardware that facilitates enhancement of objects in the AVR object datastore 306 to create enhanced AVR objects. Enhancements can include adding AVR data visualization features, AVR interactivity, AVR dynamic personalization, animation features, and audio features, to name several. In a specific implementation, the AVR object enhancement engine 308 enhances AVR objects to improve one or more of emotional stimulation, intellectual stimulation, interactivity capabilities, personalization, multiuser collaboration capabilities, or surprise. An example of an AVR object enhancement engine, such as the AVR object enhancement engine 308, is described in more detail later.

In the example of FIG. 3, the AVR media authoring engine 310 is intended to represent a specifically-purposed hardware that enables positioning AVR objects in an AVR scene and configuring the environment and flow of AVR media. In a specific implementation, the AVR media authoring engine 310 includes tools that enable an AVR media author to modify virtual space-time characteristics, in addition to including tools to enable the AVR media author to position AVR objects within the space-time. Certain aspects of the virtual space-time or AVR objects can be left to an AVR media audience member to configure, depending upon implementation- and/or configuration-specific factors and/or the choices of the AVR media author. An example of an AVR media authoring engine, such as the AVR media authoring engine 310, is described in more detail later.

In this paper, a scene is intended to be a virtual (potentially time-sensitive) volume in which AVR objects can be positioned. It should be noted a scene may be characterized as what amounts to a field of view (FOV) in contexts outside of this paper, but in this paper, a scene is not a FOV and a FOV is explicitly referred to as such. Accordingly, as used in this paper, a scene assumes unique (within the context of the scene) virtual space-time points to which an AVR object can be tied. Where it is desirable to distinguish between a first scene at a first time and a second scene at a second time, the first scene and the second scene can be referred to as "scene instances," and this terminology is used hereinafter. Where it is desirable to describe a time-varying scene, multiple time-adjacent scenes can be referred to as a "scene sequence," and this terminology is used hereinafter. Where it is desirable to describe every scene instance for a given virtual space-time, the collection of every scene instance can be referred to as a "scene tree," and this terminology is used hereinafter. It may be noted a scene tree can consist of a single scene instance if the scene does not vary over time, a single scene sequence if the scene has no conditional branches and unfolds in a linear fashion, or a collection of scene instances and/or scene sequences if conditional branching is enabled.

Figure 4:
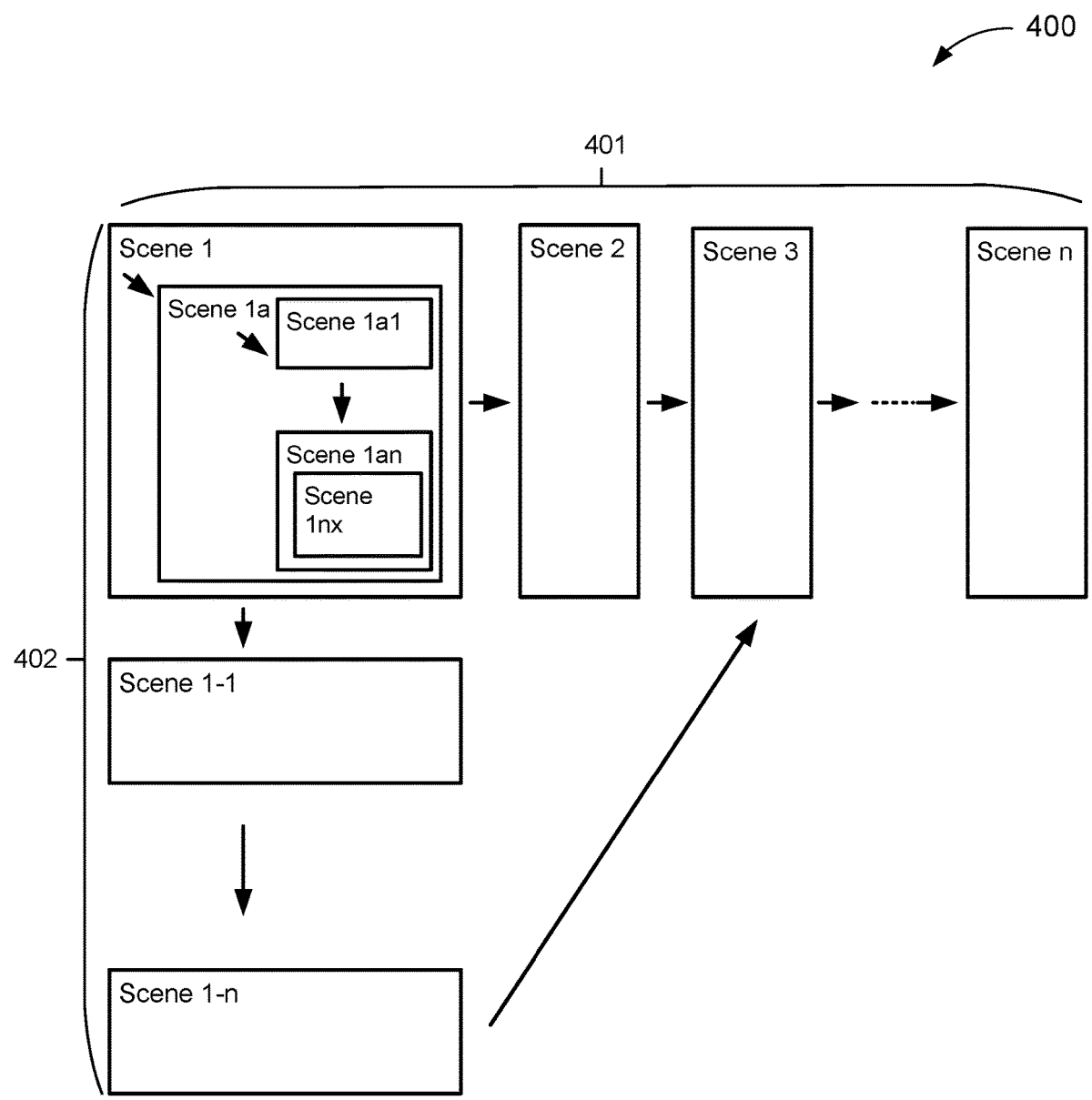
FIG. 4 depicts a diagram of an example of a scene tree.

FIG. 4 depicts a diagram 400 of an example of a scene tree. The diagram 400 includes a scene sequence 401 and a scene sequence 402. The scene sequence 401 includes a sequence of scenes 1 through n, and the scene sequence 402 includes a sequence of scenes 1 through 1-n. Further, the scene 1 includes a scene 1a, which includes a sequence of scenes 1a1 through 1an, and the scene 1an includes a scene 1nx.

In the example of FIG. 4, each scene can be shown in relation to each other either as a sequence, or as "zoom in" to greater level of detail, always enabling an AVR media author to understand the spatial relationships between each scene. For example, as shown by the scene 1 in the scene sequence 401, any scene, similar to a paragraph of information, can be organized in a linear fashion similar to a storyline, as a series of content topics in a straightforward sequence. For example, as shown by the scene 1 through the scene 1-n in the scene sequence 402, any scene can have their own story-line, so that any part of scenes can be the starting point its own story. More particularly, for instance, when the scene 1-n is a starting point, the scene 1-n is followed by the scene 3, without passing through the scene 2. For example, as shown by the scene 1a in the scene 1, a scene can embed additional scenes, so as to include information that makes cognitive sense as a drill down to deeper information. At the scene 1a, additional information at a similar level of detail can be shown in sequence, represented as the scene 1an. Because all informational concepts can contain more and more specific detail, there is no end to the number of detailed layers of drill down, so that any of the scenes can have any amount of deeper drill downs, as shown by scene 1nx.

In a specific implementation, a scene tree is designed to unfold within a spherical virtual space-time. One specific type of object that can be positioned in a spherical virtual space-time is a skyscape. A skyscape includes features that do not change size as an audience member moves toward a boundary of the spherical virtual space-time, which improves a sense of mastery over the virtual environment for audience members because of the similarity between the skyscape and the celestial map human beings see practically every day. In alternative implementations, the scene tree unfolds within a virtual space-time that is not spherical (e.g., cubic, rhombic, or some other volume). The scene tree can also unfold between a "ground" and a "sky" much like the space between the surface of the earth and some arbitrary ceiling, but of any desired shape, either wrapping around to form a contained space-time or unbounded along one or more axes. A space-time with no skyscape can be characterized as having no skyscape or as having a transparent sky scape. In this paper, whether the skyscape is transparent or does not exist depends upon whether a skyscape is optional given the particular implementation or configuration. Specifically, if a skyscape can be applied to the boundary of a space-time, a transparent skyscape is referred to as such, but if no skyscape can be applied to the boundary then the space-time is referred to as having no skyscape. A scene tree may be part of an AVR media. For example, multiple space-times could be connected via links that would enable an AVR media audience member to navigate from a first scene tree to a second scene tree. As used in this paper, an AVR media is assumed to include one or more scene trees and, if there is more than one scene tree, the link between the multiple scene trees.

In the example of FIG. 3, the AVR media datastore 312 is intended to represent data structures output by the AVR media authoring engine 310. The data structures can include portions of an AVR media that can be combined with other AVR media portions while in presentation mode (e.g., during runtime). For example, an AVR display object could include a feed from an AVR media component that varies depending upon time (e.g., a current events feed); the geographic, demographic, psychographic, or behavioristic features of an audience member; or on-the-fly commands (e.g., a URL entered during the presentation), to name a few alternatives. An AVR media can, depending upon implementation- and/or configuration-specific factors, include global environmental constants or global environmental variables that are set to a constant value for each of the one or more scene trees of the AVR media. An AVR media can also, depending upon implementation- and/or configuration-specific factors, include global environment variables that differ in value across first and second scene trees, first and second scene sequences, or even first and second scene instances.

In the example of FIG. 3, the AVR media playback engine 314 is intended to represent a specifically-purposed hardware that enables playback of an AVR media. The AVR media playback engine 314 is suitable for implementation on an AVR media device, such as is illustrated by way of example in FIG. 1. The AVR media playback engine 314 is also suitable for implementation on at least some AVR media authoring devices (either as a troubleshooting tool or because the AVR media authoring device is dual-purposed to also operate as an AVR media playback device), such as is illustrated by way of example in FIG. 1. The capabilities of the AVR media playback engine 314 can depend upon the capabilities of a device on which the engine is installed, the richness of features incorporated into an AVR media being presented by the engine, control granted to a user of the device, or other factors, but at a minimum the AVR media playback engine 314 enables playing AVR media as AVR media. An example of an AVR media playback engine, such as the AVR media playback engine 314, is described in more detail later.

In the example of FIG. 3, the AVR multiuser access engine 316 is intended to represent a specifically-purposed hardware that enables multiuser access to AVR media. Depending upon implementation- and/or configuration-specific factors, audience members can be slaved to a master (e.g., a presenter) in multiuser mode or audience members can be free to establish their own FOV within a given scene. In a specific implementation, the AVR multiuser access engine 316 uses subjective coordinates to place all audience members at a single location within a scene, though each audience member may be able to look around to see avatars of other audience members (each of which have an FOV from the single location and perceive other audience members to be at a different location). As used in this paper, audience members in a scene who are aware of other audience member avatars can be characterized as being in the same room. An example of an AVR multiuser access engine, such as the AVR multiuser access engine 316, is described in more detail later.

In an example of operation, a system such as is illustrated in FIG. 3 operates as follows. The real world data datastore 302 stores (or buffers) data received from one or more sources. The AVR creation engine 304 converts data into an AVR object. The AVR creation engine 304 can also convert non-collaborative and/or non-VR media into an AVR object. The AVR objects (or components thereof) are stored in the AVR object datastore 306. The AVR object enhancement engine 308 enhances the AVR objects by adding animation, interactivity, or the like. The AVR media authoring engine 310 acts in accordance with authoring agents to place a subset of the AVR objects in a virtual space-time. The AVR media authoring engine 310 may or may not also act in accordance with authoring agents to set global (relative to a set of virtual space-times) or local (for a given virtual space-time) parameters or otherwise set rules associated with multiple virtual space-times, including how certain AVR objects behave within the space-times; layout AVR objects in a plurality of virtual space-times; and link a plurality of space-times to form an extended scene tree. The AVR media generated by the AVR media authoring engine 310 is stored in the AVR media datastore 312. The AVR media playback engine 314 plays back one or more of the AVR media in the AVR media datastore 312. Depending upon implementation- and/or configuration-specific factors, playback can include on-the-fly conversion of real world data from the real world data datastore 302 for display within an object (e.g., displaying a feed within an appropriate AVR object that is updated after storing the AVR media in the AVR media datastore 312); personalization of one or more aspects in an audience member's FOV; and facilitating interaction with interactive AVR objects, to name a few options. The AVR multiuser access engine 316 provides multiuser access to an AVR media, which can include sharing, security, room selection, head tracking, and mixed reality transitions, to name several.

Figure 5:
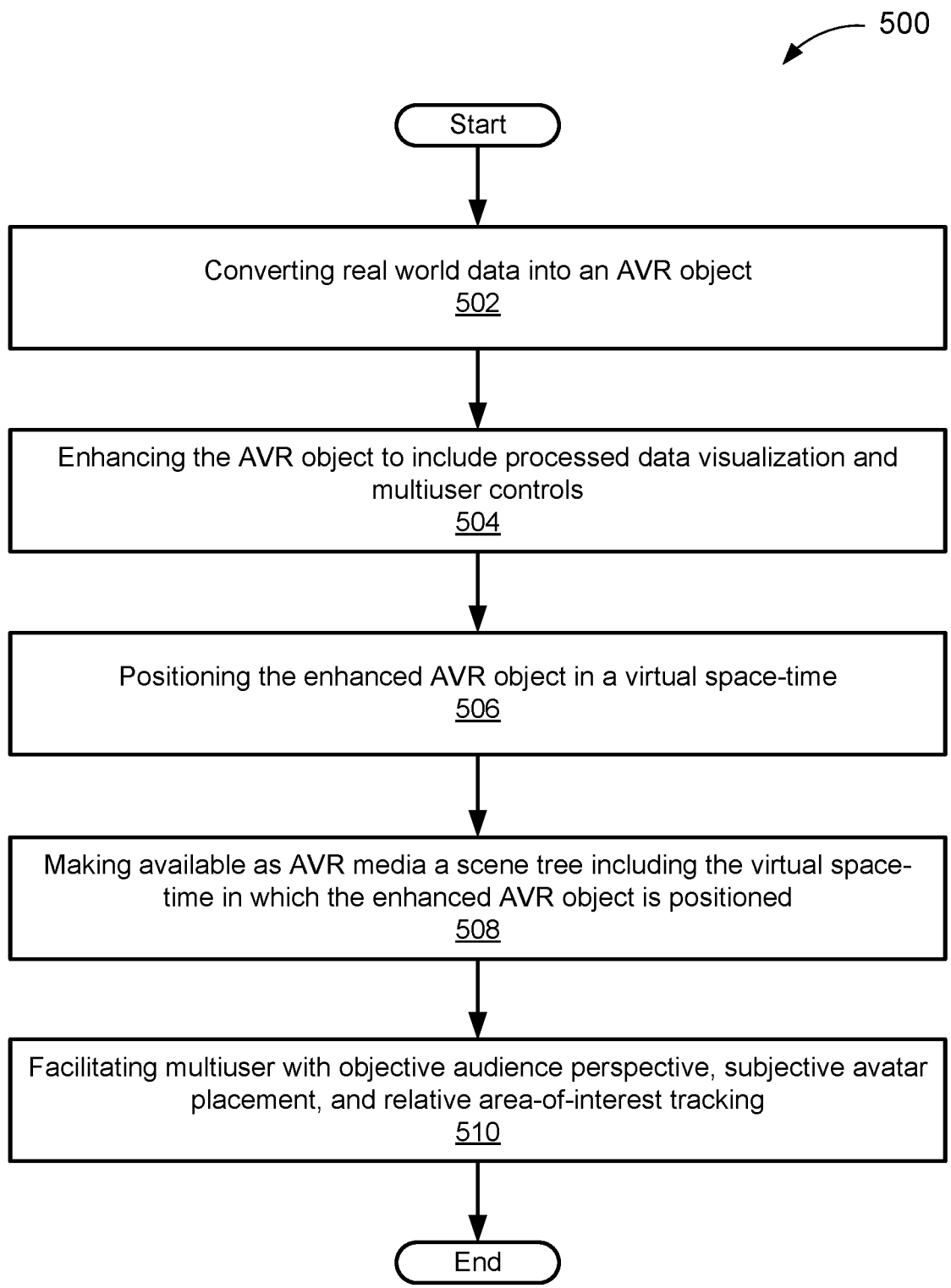
FIG. 5 depicts a flowchart of an example of a method for AVR media creation and consumption.

FIG. 5 depicts a flowchart 500 of an example of a method for AVR media creation and consumption. The flowchart 500 starts at module 502 with converting real world data into an AVR object. Where real world data is raw data ("unprocessed data") a preliminary step of cleaning may occur prior to conversion from real world data to an AVR object. Processed data can be presented in a chart, graph, or some other format that, because the presentation has traditionally been visual, is often referred to as a "data visualization"

though data can be presented in an entirely audio or in a multimedia format. Hereinafter in this paper, if a distinction between raw data and processed data is desired, the terms raw data and processed data are used. The term "processed data visualization" is intended to refer to processed data that has been converted into an AVR object using techniques described in this paper. Similarly, "raw data visualization" is intended to refer to raw data that has been converted into an AVR object and specifically is not intended to refer to raw data that has been cleaned and processed for presentation in a conventional chart or graph. The relevant AVR objects (associated with raw data visualization or processed data visualization) can be referred to as AVR symbol objects to differentiate them from AVR media objects, where differentiation is desired.

In the example of FIG. 5, the flowchart 500 continues to module 504 with enhancing the AVR object to include processed data visualization and multiuser controls. In a specific implementation, depending upon the data format, enhancement includes expanding data items outside of a typical frame (beyond rectangles in space) as part of a process that is referred to in this paper as "data spatialization," which is discussed later in more detail. Processed data visualization is advantageous because it increases intellectual stimulation due to the way in which humans process information through the hippocampus and can augment the emotive capabilities of AVR media objects rendered in association with AVR symbol objects. In various embodiments, other enhancements, such as animation, audio, interactivity, and playback customization features are also possible. Processed data visualization, multiuser controls, and other enhancements are described in more detail later.

In the example of FIG. 5, the flowchart 500 continues to module 506 with positioning the enhanced AVR object in a virtual space-time. In this example, the AVR object has been enhanced with processed data visualization and may, therefore, be referred to as an AVR symbol object. It may be noted other AVR objects will in most instances also be positioned within the virtual space-time to create an AVR media, but the AVR symbol object is explicitly presented in the flowchart for illustrative convenience. Advantageously, AVR symbol objects provide a sense of concreteness to the symbols (e.g., alphanumerics) the AVR symbol objects comprise. In part because an optimal FOV for an audience member can be controlled or suggested by the layout of the AVR symbol objects, audience members can be placed within symbols as if the symbols were a physical thing, thereby activating the hippocampus in the same way objects perceived in real space activate the hippocampus. Thus, audience members organize the processed data as if it were a perceived physical thing, which improves impact and retention.

In the example of FIG. 5, the flowchart 500 continues to module 508 with making a scene tree including the virtual space-time in which the enhanced AVR object is positioned available as AVR media. In a specific implementation, AVR media is provided as a collection of files stored in a local file directory on an AVR media playback device. In an alternative implementation, some or all of the files are provided from a relatively local server (e.g., a LAN server) or a relatively remote server (e.g., a website accessible via the Internet or public switched telephone network (PSTN)). Instead or in addition, AVR media resources can be provided from a repository (e.g., cloud storage) associated with an author, a presenter, an audience member, an entity associated with an author, presenter, or audience member, or a third party.

In the example of FIG. 5, the flowchart 500 ends at module 510 with facilitating multiuser with objective audience perspective, subjective avatar placement, and relative area-of-interest tracking. Objective audience perspective means a virtual sensor (i.e., a "sensor" for a field of view (potentially including audio) within a virtual space-time) for each audience member has a shared position within a scene. Advantageously, by providing objective audience perspective, AVR symbol objects can be brought to every audience member in the same way; the audience member need not move around to get an optimal FOV on an area of interest. It should be noted common virtual sensor position does not necessitate common virtual sensor orientation. For example, depending upon implementation- and/or configuration-specific factors, a common virtual sensor can be locked to a common sensor orientation to provide each audience member a common FOV (ignoring for illustrative purposes personalization, subjective avatar placements, or the like) or audience members may be given the ability to make subjective changes in virtual sensor orientation (e.g., by looking around while wearing a VR headset). Subjective avatar placement means despite common virtual sensor positioning, FOV for audience members can be rendered so as to place avatars of other audience members at locations other than the common virtual sensor position. Advantageously, by providing subjective avatar placement, an audience member can keep track of other audience members (or, more precisely, avatars of the other audience members) in a manner that is natural to human beings (i.e., spatially). Relative area-of-interest tracking means keeping track of head movement, eye movement, and/or AVR object selection. Advantageously, by providing relative area-of-interest tracking, audience members can detect areas of interest of other audience members by having their avatars turn their heads, eyes, or point with hands in the direction of AVR objects at which the other audience members are directing their attention.

Figure 6:
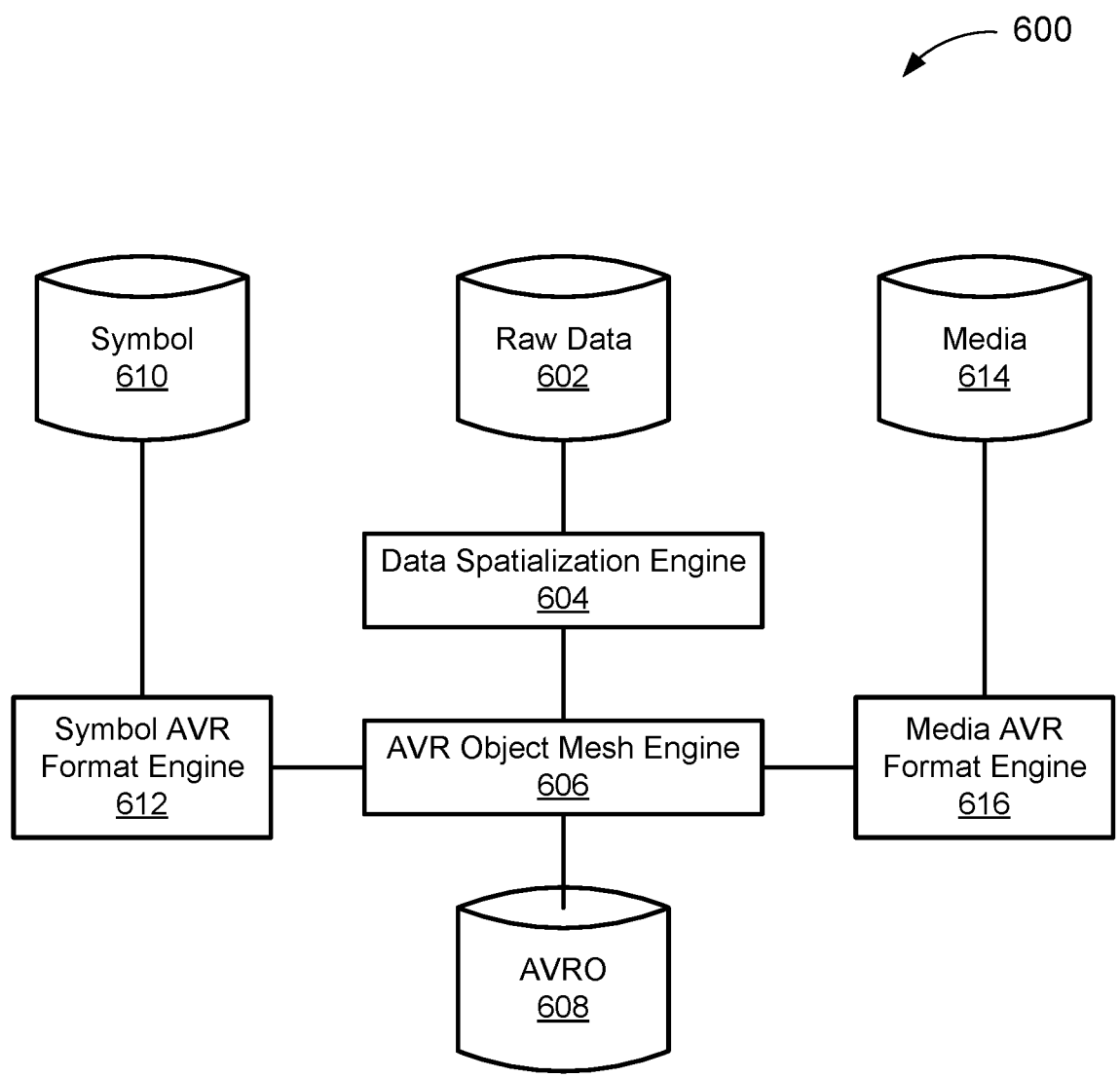
FIG. 6 depicts a diagram of an example of an AVR object creation system.

FIG. 6 depicts a diagram 600 of an example of an AVR object creation system. The diagram 600 includes a raw data datastore 602, a data spatialization engine 604, an AVR object mesh engine 606, an AVR object datastore 608, a symbol datastore 610, a symbol AVR format engine 612, a media datastore 614, and a media AVR format engine 616. In the diagram 600, the raw data datastore 602 is coupled to the data spatialization engine 604; the symbol datastore 610 is coupled to the symbol AVR format engine 612; the media datastore 614 is coupled to the media AVR format engine 616; and the data spatialization engine 604, the AVR object datastore 608, the symbol AVR format engine 612, and the media AVR format engine 616 are coupled to the AVR object mesh engine 606.

In the example of FIG. 6, the raw data datastore 602 is intended to represent discrete data items. Raw data can be provided in a plethora of data structures/formats, such as text files; signals from IoT devices; header or payload of frames or packets; spreadsheets; GPS, timestamp, or other metadata from media images; or numbers, charts, or graphs embedded within a document; to name several, but if only the data within the data structure is to be used in an AVR object, the data structure itself can be discarded (at least conceptually), leaving only the raw data. The raw data can either be raw in the conventional sense (as in, unprocessed) or picked from a data visualization format, such as a graph or chart, the data visualization object itself being handled by some other component of the AVR object creation system. Thus, the term "raw data" used in this paper is broader in the sense the data items can be selected from a data visualization object, but, obviously, narrower than simply "data."

In the example of FIG. 6, the data spatialization engine 604 is intended to represent specifically-purposed hardware that presents raw data in an unframed, spatial format. An appropriate tagline for this experience is "escaping the tyranny of the frame" in the sense the raw data is presented as AVR symbol objects outside of a frame, which can be anchored to a space-time location. To the extent alphanumeric characters are chosen, at least in part, for illustrating the raw data in an AVR symbol object, signed distance field fonts can be used to enable zooming in and out of the data while retaining readability. To the extent graphical forms are chosen, at least in part, for illustrating the raw data in an AVR symbol object, an AVR media object can be created, reused, or updated for that purpose. As used in this paper, an AVR object can be a composite object that includes both symbol objects and media objects, while an AVR symbol object includes at least a symbol object and may also include a media object, and while an AVR media object includes at least a media object and may also include a symbol object.

In the example of FIG. 6, the AVR object mesh engine 606 is intended to represent specifically-purposed hardware for creating an AVR object from non-AVR data or data structures (such as raw data, text, or media). In a specific implementation, the AVR object mesh engine 606 makes use of an AVR framework tools datastore (not shown), which includes at least an AVR geometry datastore and an AVR materials datastore. As used in this paper, every AVR object has a geometry and a materials set. The geometry defines the metes and bounds of the AVR object. A practical limitation on the geometry framework is that the geometry facilitate scaling, which in some implementations can result in orders of magnitude differences in the size of an AVR object when rendered. The materials set defines surface features of an AVR object. A practical limitation of the materials framework is that the material cover be defined for all outer surfaces of a three-dimensional AVR object, though a failure to enforce this limitation need not necessarily "break" AVR media and may simply make the AVR media less aesthetically appealing. The materials set can include different materials for different surfaces or portions of surfaces of an AVR object and may or may not also include materials that are used at different times. In a specific implementation, material can include media, such as video, that covers at least a portion of an AVR object geometry. In a specific implementation, if the materials set is the null set for an AVR object, the AVR object is assumed to be completely transparent. Uses of transparent AVR objects include interactive objects that hover over other objects or objects that take up virtual space, but that are not visible (though they may be audible). In a specific implementation, the materials set cannot be empty (i.e., the materials set includes at least one material); in two alternatives of the specific implementation, transparent material may or may not be available as an element of the materials set. It should be noted that the term "transparency" is sometimes used to describe a degree of transparency, where only a material with 100% transparency would be considered truly transparent, materials with 0% transparency would be considered opaque, and materials with more than 0% and less than 100% transparency would be considered translucent.

In the example of FIG. 6, the AVR object datastore 608 is intended to represent AVR object data structures suitable for use in AVR media. In a specific implementation, the AVR object datastore 608 can also include AVR object components that are suitable for incorporation into AVR objects, but that are not suitable for use in AVR media without incorporation.

In the example of FIG. 6, the symbol datastore 610 is intended to represent a repository of symbols organized so as to convey meaning (e.g., letters organized as words and words and other symbols organized as sentences). While the order of symbols of text is relevant because the order of symbols is associated with a particular meaning, a data structure containing text may be considered irrelevant in certain contexts. For example, symbols from an unformatted text file, a text document, an instant text message, a scanned hand-written document, or a dialog box on a web page convey meaning associated with symbol order that does not depend upon the context in which the symbols are presented. To the extent a context other than meaning is considered relevant, such context can be captured for representation as was described above for raw data or as is discussed later for media. In a specific implementation, the symbol datastore 610 includes semantic and syntactic components, such as a string of symbols organized as, e.g., an English sentence. In a specific implementation, the symbol datastore 610 stores format and/or data structure in case it becomes relevant, but it should be understood all symbolic input could be converted to a standardized, proprietary, or universal data structure that omits the original format or data structure. To the extent symbols are extracted from a format, the data spatialization engine 604 can spatialize the symbols (thereby freeing them from a frame). As a practical matter, it is likely non-AVR media with symbols visible in the media (e.g., an image of a person holding a book with a visible title) will be converted to an AVR media object, but a system could be designed or configured to extract symbols from images and treat the symbols as described here, while treating the rest of the image as described later, then overlaying the symbols on the relevant portion of the image during rendering.

In the example of FIG. 6, the symbol AVR format engine 612 is intended to represent specifically-purposed hardware for converting symbols, such as text, into an AVR symbol object format. A characteristic of AVR symbol objects is that the symbols are rendered as virtual objects. This characteristic requires that the AVR symbol objects have a geometry and materials, which are applied by the AVR object mesh engine 608 as described previously. Moreover, to avoid anti-immersion impact, the symbols should be scalable in size without pixelation or other visibly unappealing effects. To varying degrees depending upon technological quality and craftsmanship, signed distance field fonts can be used for symbols to provide the scaling capabilities, though other fonts that enable order of magnitude scaling of text without pixelation and that are suitable for use in an AVR context can be used.

In a specific implementation, the symbol AVR format engine 612 is configured to convert symbols, such as text, into a symbol sculpture (e.g., text sculpture). As opposed to a sculpture formed of dots, the symbol sculpture may contain some meaning by the included symbols. For example, a text sculpture formed in a shape of a map of the United States may contain some meaningful texts corresponding to each state in the corresponding location of each state. Symbols may be presented with corresponding font and/or colors to provide additional meaning. Depending upon implementation-specific or other considerations, the number of symbols (characters) to form a sculpture may contain 250,000 characters or 450,000 characters.

In a specific implementation, the symbol AVR format engine 612 is configured to cause at least part of symbols included in a symbol sculpture to be removed depending on a shading and/or an anti-alias demand in the presentation of the symbol sculpture. For example, some symbols located outside of a FOV or far away from a central view point of a viewer may be removed relatively quickly. Symbols included in a symbol sculpture presented may or may not move independently.

In the example of FIG. 6, the media datastore 614 is intended to represent a repository of images, videos, shapes, or the like. In a specific implementation, the media datastore 614 includes media in many different formats, though it should be recognized the various formats could be converted to a proprietary, standardized, or universal format prior to being stored in the media datastore 614. To the extent a context other than geometry and materials is considered relevant, such context can be captured for representation as was described above for raw data or symbols. Metadata can be interesting because it facilitates sharing and collaboration. For example, photos can have GPS and timestamp metadata that may or may not be displayed when an AVR object derived from the image is rendered, but is useful for determining timeliness and location. This can facilitate on-the-fly swapping of older for newer images, mapping media to a world grid, and remixing, to name a few. Metadata can also be used to personalize an AVR experience for an audience member.

In the example of FIG. 6, the media AVR format engine 616 is intended to represent specifically-purposed hardware for converting media, such as images, into an AVR media object format. In a specific implementation, the media AVR format engine 616 uses vector imaging to convert images into lines and triangles that can be rendered crisply regardless of zoom. Advantageously, in order to improve utility in an AVR context, scalable vector graphics (SVG) can be used for 3D object creation. This is advantageous because ubiquitous programs like Adobe Illustrator® use SVG, so making use of SVG in 3D increases the availability of media for conversion to an AVR-compatible format. The data spatialization engine 604 can, if applicable, spatialize elements (thereby freeing media from a frame). Some media may be placed on objects. For example, a video could play on the surface of a parallelepiped-shaped virtual object. In such instances, the media can be characterized, at least conceptually, as a material applied to a portion of an AVR object geometry. The AVR object mesh engine 508 can apply a geometry and materials set to any media that is fully transformed into (or made into an object component of) an AVR media object.

In an example of operation, a system such as is illustrated in FIG. 6 operates as follows. Raw data in the raw data datastore 602 is spatialized by the data spatialization engine 604 and converted into AVR objects by the AVR object mesh engine 606 for storage in the AVR object datastore 608. Symbols in the symbols datastore 610 are transformed into an appropriate format (if necessary) by the symbol AVR format engine 612, spatialized (if necessary) by the data spatialization engine 604, and converted into AVR objects by the AVR object mesh engine 606 for storage in the AVR object datastore. Media in the media datastore 614 is transformed into an appropriate format (if necessary) by the media AVR format engine 616, spatialized (if necessary) by the data spatialization engine 604, and converted into AVR objects by the AVR object mesh engine 506 for storage in the AVR object datastore.

Figure 7:
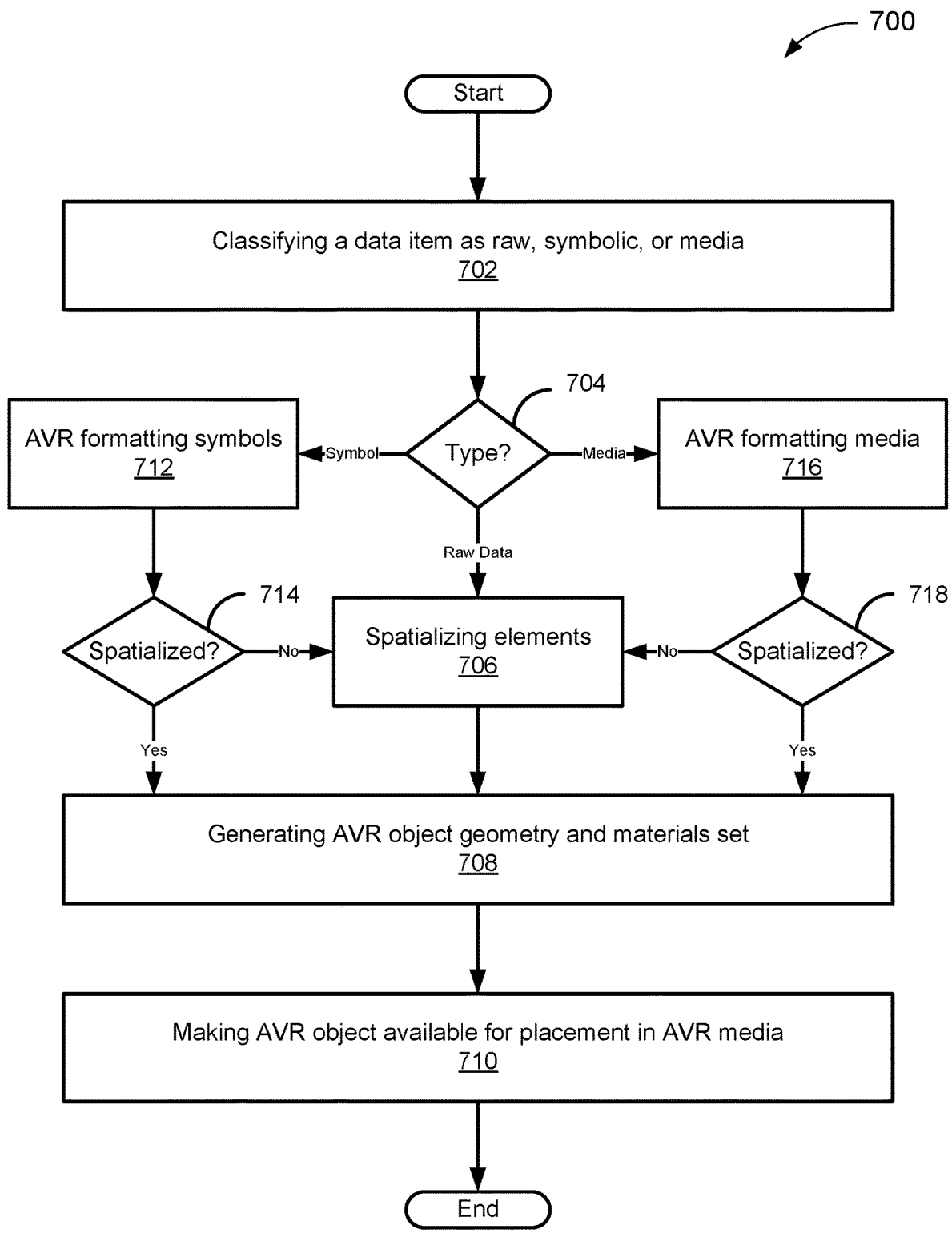
FIG. 7 depicts a flowchart of an example of a method for AVR object creation.

FIG. 7 depicts a flowchart 700 of an example of a method for AVR object creation. The flowchart 700 starts at module 702 with classifying a data item as raw, symbolic, or media. Raw data is data that has a meaning independent of its format. For example, raw data could have a format of a sequence of comma-delimited numbers in a flat (text) file, but the numeric values could be reorganized and presented in some other format without changing the information obtainable from the raw data. Symbolic data is data that has a meaning dependent upon order within a string of symbols. For example a string of letters forms a word and a string of words and other characters forms a sentence. Symbolic data has semantic (meaning) and syntactic (form) components. Media data includes images, videos, and/or audio. Images include a varying number of pixels (the number of pixels dependent upon the resolution) with a variety of colors (the number of colors dependent upon the technology). Analog images do not have pixels, but, at least in some implementations, analog images are digitized prior to use, which confines the image to a predefined maximum number of pixels and colors. Video is much like images, but also includes an order. Video images are sometimes referred to as video frames, and the frames may or may not include a full image, depending upon (primarily) data compression techniques that are used. For example, I-frames are complete images, P-frames hold only changes in the image from a previous frame, and B-frames use differences between the current frame and both the preceding and following frames. Audio includes audio signals that are representative of sounds. Audio is similar to video in that the order of sounds is significant and there are no "image-like" audio data items because instantaneous sounds have little value in a consumer-oriented media (though "instantaneous" sounds could, of course be represented as having a given frequency, volume, etc. in some contexts).

In the example of FIG. 7, the flowchart 700 continues to decision point 704 where it is determined whether the data item is raw data, symbolic data, or media. If it is determined the data is raw data (704—Raw Data), then the flowchart 700 continues to module 706 with spatializing elements. Raw data can be sorted, grouped, ordered, and otherwise manipulated for data visualization purposes. In an AVR media context, the raw data must be spatialized within a virtual space-time to allow the raw data to be rendered. A system that facilitates the manipulation of raw data will also generally include data processing (e.g., data visualization) tools that enable an author or agent thereof to render processed data in a desired container (e.g., a chart, graph, or the like).

In the example of FIG. 7, the flowchart 700 continues to module 708 with generating AVR object geometry and materials set. Processed data and containers thereof have a geometry and materials set. Raw data, if it is desirable to render it as an object, also has a geometry and materials set.

In the example of FIG. 7, the flowchart 700 ends at module 710 with making AVR object available for placement in AVR media. The placement of AVR objects in a virtual space-time of an AVR media is described in more detail later.

Returning to decision point 704, if it is determined the data is symbolic data (704—Symbol), then the flowchart 700 continues to module 712 with AVR formatting symbols. AVR formatting of symbols can include, for example, converting the symbols to a signed distance field font. The flowchart 700 then continues to decision point 714 where it is determined whether the symbolic data is spatialized. If it is determined the symbolic data is not spatialized (714—No), the flowchart 700 continues to module 706 and continues from there as described previously. Symbolic data spatialization may include breaking the symbolic data out of constraining data structures (such as frames). Depending upon implementation- or configuration-specific factors, features of symbolic data other than semantics and syntax can be removed. A system that facilitates the manipulation of symbolic data will generally include symbol (word) processing tools (e.g., spell checkers, editors, translation tools, etc.) that enable an author or agent thereof to render processed symbolic data in an edited form or in a different language. If, on the other hand, it is determined the symbolic data is spatialized (714—Yes), the flowchart 700 continues to module 708 and continues from there as described previously.

Returning to decision point 704, if it is determined the data is media (704—Media), then the flowchart 700 continues to module 716 with AVR formatting media. AVR formatting of media can include, for example, using a vector imaging format such as SVG to convert images or frames of video to 3D. The flowchart 700 continues to decision point 718 where it is determined whether the media is spatialized. If it is determined the media is not spatialized (718—No), the flowchart 700 continues to module 706 and continues from there as described previously. Media spatialization may include breaking media out of constraining data structures (such as frames). Depending upon implementation- or configuration-specific factors, symbolic features can be removed from media (potentially for reapplication later after AVR objectification of the symbolic features). A system that facilitates the manipulation of media will generally include media editing tools that enable an author or agent thereof to render processed media in an edited form. If, on the other hand, it is determined the media is spatialized (718—Yes), the flowchart 700 continues to module 708 and continues from there as described previously.

Figure 8:
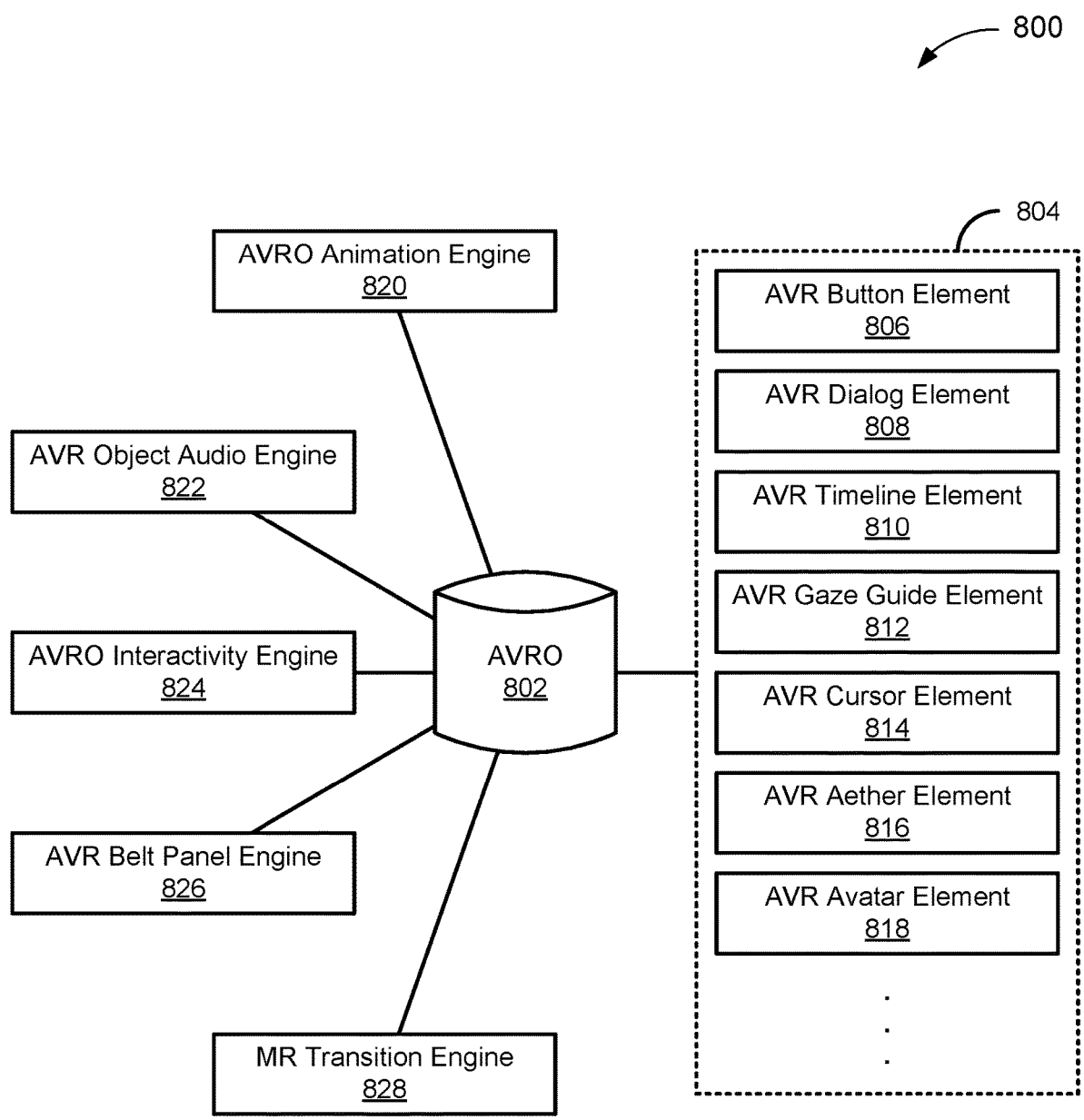
FIG. 8 depicts a flowchart of an example of an AVR object enhancement system.

FIG. 8 depicts a diagram 800 of an example of an AVR object enhancement system. The diagram 800 includes an AVR object datastore 802; an AVR element datastore 804, which includes an AVR button element 806, an AVR dialog element 808, an AVR timeline element 810, an AVR gaze guide element 812, an AVR cursor element 814, an AVR aether element 816, an AVR avatar element 818, and other elements; an AVR object animation engine 820, an AVR object audio engine 822, an AVR object interactivity engine 824, an AVR belt panel engine 826, and a mixed reality (MR) transition engine 828. The AVR element datastore 704, AVR animation engine 820, AVR audio engine 822, AVR object interactivity engine 824, AVR belt panel engine 826, and MR transition engine 828 are coupled to the AVR object datastore 802.

In the example of FIG. 8, the AVR object datastore 802 is intended to represent AVR object data structures suitable for use in AVR media. An AVR object CRUD engine is assumed (an example of an AVR object creation is illustrated with reference to FIG. 6; read access to the AVR object datastore is assumed throughout and should be considered part of a specific implementation; an example of AVR object updating is described with reference to FIG. 8 below; delete access to the AVR object datastore is not shown, but should be considered part of a specific implementation).

In the example of FIG. 8, the AVR element datastore 804 is intended to represent elements (components, templates, or the like) for use with AVR objects. The AVR button element 806 is intended to represent a template for an interactive control element that can be "clicked." It should be understood that "clicked" can include placing a pointer over a button and selecting the button using mechanisms other than a mouse click (e.g., it could include voice-command selection, hovering for a time, etc.). A preconfigured AVR button object may or may not be stored in the AVR object datastore 802.

The AVR dialog element 808 is intended to represent a template for an interactive graphical control element that communicates information to audience members and prompts them for a response. In an AVR context, the dialog element need not be represented as a dialog box because AVR objects are not constrained by frames. The AVR button element 806 may or may not be considered an element of the AVR dialog element 808, which can include a button. A preconfigured AVR dialog object may or may not be stored in the AVR object datastore 802.

The AVR timeline element 810 is intended to represent a template for a zoomable interactive timeline with elements that are tied to AVR objects. The AVR timeline is a powerful tool in an AVR media context because data on the timeline is presented as graphical elements, which improves retention of elements displayed on the timeline due to both the fact the data is presented as an object and due to the apparent distances between the objects on the timeline. A preconfigured AVR timeline object may or may not be stored in the AVR object datastore 802.

The AVR gaze guide element 812 is intended to represent a template for a gaze guide icon. A gaze guide is a mechanism for guiding an audience member in the direction of presentation flow. In a specific implementation, the gaze guide is an arrow that points in the direction of presentation flow when an audience member is not looking in a direction the author wishes. In alternatives, the gaze guide is some other AVR object that encourages an audience member to follow it including, potentially, audible instructions. A preconfigured AVR gaze guide object may or may not be stored in the AVR object datastore 802.

The AVR cursor element 814 is intended to represent a template for a cursor icon. A cursor is a mechanism for identifying a point of selection. On a flat-screen computer, for example, the cursor can look like a vertical line in a word processing application or a pointer in a CAD application. In an AVR media context, the cursor is rendered as an object. Depending upon implementation- or configuration-specific factors, the cursor may grow larger when close and smaller when far. A preconfigured AVR cursor object may or may not be stored in the AVR object datastore 802.

The AVR aether element 816 is intended to represent a template for an aether icon. Aether icons are located throughout a virtual space-time. In a specific implementation, the aether icons are organized in a 3D matrix, with closer aether icons appearing larger than those farther away. Advantageously, the aether icons do not change size with zoom, which gives audience members a feeling of grounding and reduces the probability of audience members experiencing motion sickness. Depending upon implementation- or configuration-specific factors, the aether icons can be increased in size for audience members who have a greater need for grounding or who are more prone to motion sickness. An author or agent thereof may also choose aether icons of varying sizes based upon aesthetics, the degree of grounding that may be called for in certain portions of a presentation, or audience safety. Depending upon implementation- or configuration-specific factors, the aether fills a virtual space-time, but can be dialed back to increase transparency at spaces farthest from grid intersections, and potentially dialed back to the point that even the grid intersections are completely transparent. In a specific implementation, the aether icons are visible as stars at grid intersections. A preconfigured AVR aether object may or may not be stored in the AVR object datastore 802.

The AVR avatar element 818 is intended to represent a template for an avatar that is rendered in multiuser mode. In a specific implementation, audience members can choose from a predetermined collection of avatars. In an alternative, audience members can provide an avatar object for rendering within an AVR media presentation. Depending upon implementation- or configuration-specific factors, avatar objects can "look" in a direction that corresponds to where an audience member is looking and "point" in a direction that corresponds to where an audience member places a cursor. A preconfigured AVR avatar object may or may not be stored in the AVR object datastore 802.

In the example of FIG. 8, the AVR object animation engine 820 is intended to represent specifically-purposed hardware that animates AVR objects. In a specific implementation, the animation options include "data visualization spin," which is a unique way of spinning an axis of a data visualization space, which includes information graphics, diagrams, and etc., defined by a plurality of axes, and present a different aspect of the data visualization space, which is generated based on different columns of data from a data store or a spreadsheet. In a specific implementation of the "data visualization spin," the "data visualization spin" may include switching between a two-dimensional presentation of the data visualization space and a three-dimensional presentation of the data visualization space, in either direction.

In a specific implementation, the animation options include "ripple animation," which is a unique way of deconstructing objects into constituent parts and moving with a time delay. In a particular implementation of "ripple animation," a meaningful representation of a real thing, an object, is initially visualized as dots in an original presentation space (e.g., a geographical map). Then, part of the dots are moved into a new presentation space (e.g., a column chart) to form a part of the new presentation space, followed by moving another part of the dots from the original presentation space to the new presentation space. This presentation of a new presentation space with the aggregation of dots may assist audience members in understanding that each column is not just a number, but rather maintains meaning from the original presentation space.

In a further specific implementation of the "ripple animation," dots are rearranged in a new presentation space, with respect to each column/category one by one, with a time delay between different columns/categories, so the columns/categories are built progressively one by one, as if the columns/categories of dots were rippling into place. Further, within each of the columns/categories, dots within a column/category are rearranged one by one with a time delay, so that dots in a single column/category are arranged progressively one by one. This ripple animation may assist understanding of mutual relationship between dots within an original presentation space and dots within a new presentation space.

In an implementation, each of the dots is a representation of a real-world object or person, and the AVR object animation engine 820 enables connections of the dots to represent a real thing via display of additional information and media, including an ability to step into a 360° photo or video providing a full immersive experience of the real thing or person behind the dot.

In the example of FIG. 8, the AVR object audio engine 822 is intended to represent specifically-purposed hardware that adds audio to objects. In a specific implementation, an AVR audio object can provide multi-channel ubiquitous audio. For example, the AVR audio object can provide narration and music. In a specific implementation, the AVR object audio engine 822 can provide spatial audio in 3D by incorporating audio into an AVR object. When close to an AVR object with spatial audio, the audio is louder; when farther from an AVR object with spatial audio, the audio is fainter.

In the example of FIG. 8, the AVR object interactivity engine 824 is intended to represent specifically-purposed hardware that adds interactivity to AVR objects. Interactive objects can be selected by audience members (or presenters) to cause an effect. The AVR button element 806, AVR dialog element 808, and AVR timeline element 810 described previously provide examples of interactivity.

In the example of FIG. 8, the AVR belt panel engine 826 is intended to represent specifically-purposed hardware that modifies a belt panel. A belt panel is an interface that is opened when an audience member performs a predefined action. In a specific implementation, looking down causes a belt panel to be displayed within an AVR media presentation. Various commands can be chosen from the belt panel, such as ending the presentation, sharing the presentation, rewind or fast forward, or the like. In a specific implementation, the belt panel cannot by modified by all authors or their agents.

In the example of FIG. 8, the MR transition engine 828 is intended to represent specifically-purposed hardware that adds MR transition functionality to an object or collection of objects. In a specific implementation, MR transition includes blurring out the real world to focus on processed data visualization within an AVR media. Alternatively, the real world could be "pushed back" to make room for chosen AVR content. When transitioning to the real world, AVR objects can be converted to lines as the AVR presentation ends (or shifts to AR). Alternatively, the real world could be "brought forward" to replace chosen AVR content. It may be noted that MR transitions could be accomplished without explicit MR elements in each AVR object.

In an example of operation, a system such as is illustrated in FIG. 8 operates as follows. The AVR object datastore 802 and AVR element datastore 804 store AVR objects and components that can be incorporated into AVR objects. The AVR object animation engine 820 incorporates animation into an AVR object, the AVR object audio engine 822 incorporates audio into an AVR object (or updates a universal audio object), the AVR object interactivity engine 824 turns an AVR object into an interactive object, the AVR belt panel engine 826 modifies the command options or appearance of an AVR belt panel, and the MR transition engine 828 incorporates MR transitions into objects or adjusts global MR transition parameters.

Figure 9:
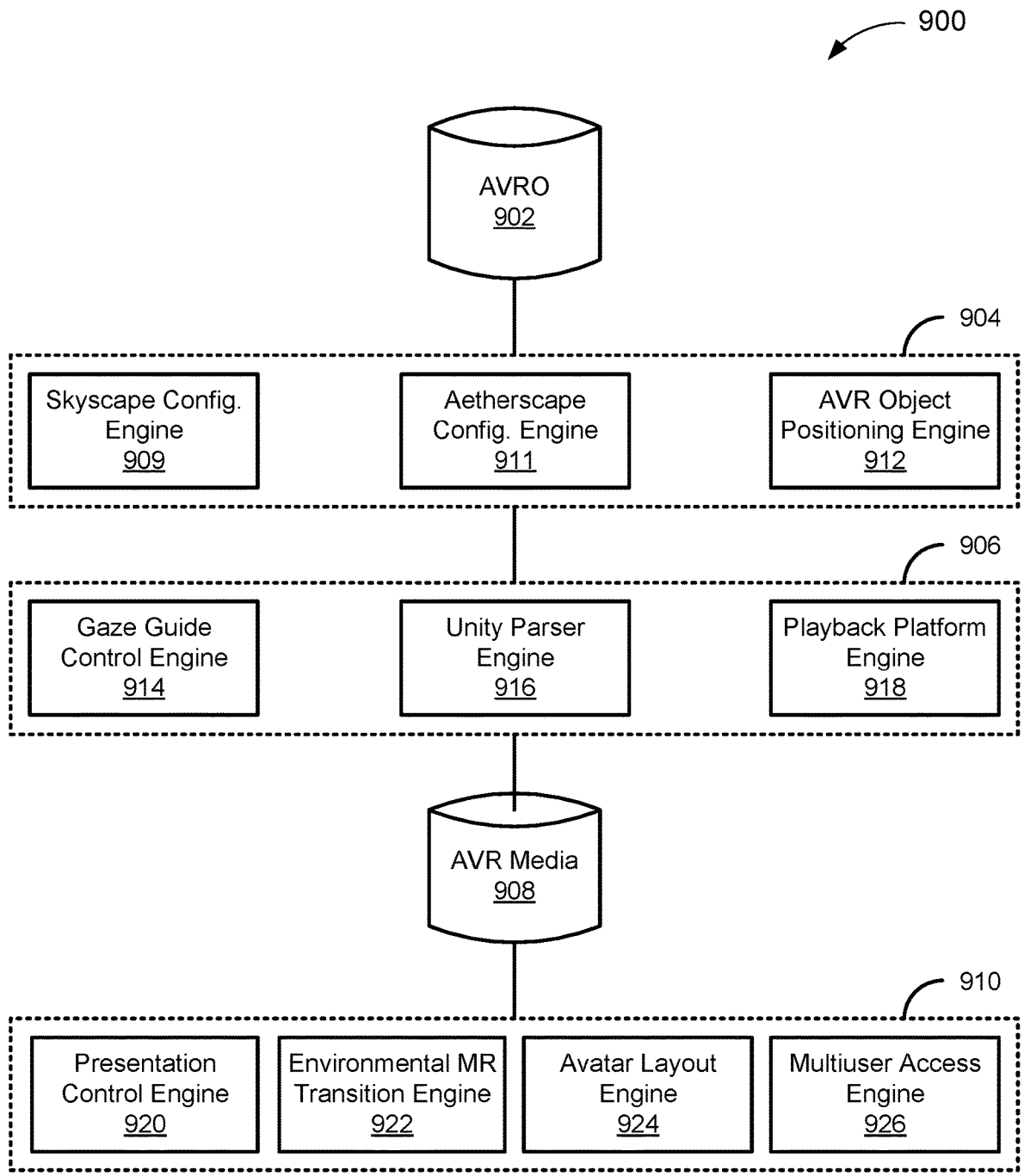
FIG. 9 depicts a diagram of an example of an AVR media authoring system.

FIG. 9 depicts a diagram 900 of an example of an AVR media authoring system. The diagram 900 includes an AVR object datastore 902, an AVR media layout subsystem 904, an AVR flow control subsystem 906, an AVR media datastore 908, and a multiuser control subsystem 910. The AVR object datastore 902 is coupled to the AVR media layout subsystem 904, the AVR flow control subsystem 906 is coupled to the AVR media layout subsystem 904 and the AVR media datastore 908, and the multiuser control subsystem 910 is coupled to the AVR media datastore 908. (It may be noted, FIG. 9 could also be organized to include an AVR actions datastore, but the AVR actions datastore is treated as part of the AVR flow control subsystem 906 in this example.)

In the example of FIG. 9, the AVR object datastore 902 is intended to represent AVR object data structures that are ready for use in AVR media. Obviously, an author with appropriate tools and authorization would be capable of switching back-and-forth between authoring AVR media and CRUDing AVR objects, but for illustrative purposes it is assumed the AVR object datastore 902 includes all AVR objects used in the description of the components of FIG. 9. It may be noted AVR objects can have dynamic components that vary with playback. For example, an AVR object can include current camera footage displayed upon a display area of a rendered AVR object in real time.

In the example of FIG. 9, the AVR media layout subsystem 904 is intended to represent multiple engines used to place objects within a virtual space-time of an AVR media and to configure an environment thereof. In the diagram 900, the AVR media layout subsystem 904 includes a skyscape configuration engine 909, an aetherscape configuration engine 911, and an AVR object positioning engine 912.

In the example of FIG. 9, the skyscape configuration engine 909 is intended to represent specifically-purposed hardware that configures the boundaries of a virtual space-time. A characteristic of virtual space-time boundaries is that they cannot be passed; the boundaries define navigable virtual space-time. In a specific implementation, a virtual space-time is bounded on all sides with a consistently distant image. What is meant by consistently distant image is that the image is not impacted by zoom, much as viewing stars in the sky are not impacted by zooming in with a telescope (due to the distance of the stars). Advantageously, a consistently distant image on the boundaries can have the effect of grounding an audience member and reducing the risk of motion sickness. It may be noted the aether may be sufficient to ground audience members, which can free up the skyscape to alternative configurations. For example, navigable virtual space-time could enable approach to the skyscape. As used herein, the ability to approach a skyscape indicates the skyscape is impacted by zoom, much as the walls, floor, and ceiling of a room can be approached by walking toward them, stooping, or climbing a ladder. In a specific implementation, a blend of consistently distant skyscape images and approachable boundaries can be used. A natural example would be a navigable virtual space time on a surface of a sphere with a ground that is an approachable boundary and a sky that has a consistently distant image. In a specific implementation, there may be no boundaries in one or more directions, resulting in an infinite virtual space-time.

In the example of FIG. 9, the aetherscape configuration engine 911 is intended to represent specifically-purposed hardware that configures the space within the boundaries of a virtual space-time. A first characteristic of the aetherscape is aether objects have a regular (or periodic) arrangement. The simplest arrangement of aether objects is probably a grid embodying a 3D Cartesian coordinate system with aether objects centered on the intersections of axes of the grid. Multiple different aether objects can be alternated to create different aether objects in alteration, such as is seen in the microscopic structure of a halite crystal (where alternating sodium and chlorine ions are organized along the cubic axes). Other regular arrangements of aether objects, such as one of the 219 possible crystal symmetries (aka crystallographic space groups), a polycrystalline arrangement, or some other arrangement that provides at least a sense of regularity, can provide sufficient grounding as to be desirable for use in AVR media. A second characteristic of the aetherscape is aether objects have invariant zoom size. Invariant zoom size is intended to mean a size that does not change when an audience member zooms into or out of a scene. A third characteristic of the aetherscape is aether objects have relative-to-camera-distance size. Relative-to-camera-distance size is intended to mean a size that varies depending upon the distance from a virtual camera.

In a specific implementation, aether objects have a volume of one unit cell, but most of the unit cell is completely transparent (or at least translucent), while the center of each unit cell is opaque or translucent. For example, a small (relative to a unit cell size) star-shaped object could be rendered in the center of each unit cell, making the aetherscape visible as a grid of stars of diminishing size as the grid stretches away from a virtual camera location. An alternative provides aether objects of less than one unit cell of volume organized on a grid. For example, an actual or conceptual grid can have three axes passing through each unit cell such that the center of each unit cell is at an intersection of grid axes; in this alternative, the aether objects can be located at the intersection of axes.

In the example of FIG. 9, the AVR object positioning engine 912 is intended to represent specifically-purposed hardware that positions AVR objects within a virtual space-time of AVR media. It should be noted that skyscape and aetherscape (particularly aether objects) could, depending upon implementation- or configuration-specific factors, be characterized as AVR objects, but are treated differently in this example.

In a specific implementation, AVR objects include a subdivided cube, which allows for absolute and relative placement of objects within it. Each AVR object has a position, which is organized by point, plane, and alignment. Point specifies x-axis, y-axis, and 9 quadrants on a 2D plane (TopLeft, CenterLeft, BottomLeft, TopCenter, Center, BottomCenter, TopRight, CenterRight, BottomRight). Plane specifies z-axis (Front, Middle, Back). Alignment describes whether the object is drawn inside the parent, to the left/right of the parent, or to the top/bottom of the parent. Advantageously, alignment further facilitates extending beyond the tyranny of the frame. In this specific implementation, there are 9×3=27 possible internal locations and even more external locations at which an object can be aligned. AVR objects can include the methods 'add( )' to add the AVR object to a parent within a scene and 'addAligned( )' to add additional aligned objects as children. An example using the parameters of the specific implementation described in the preceding paragraph is provided with reference to FIGS. 10 and 11.

Figure 10:
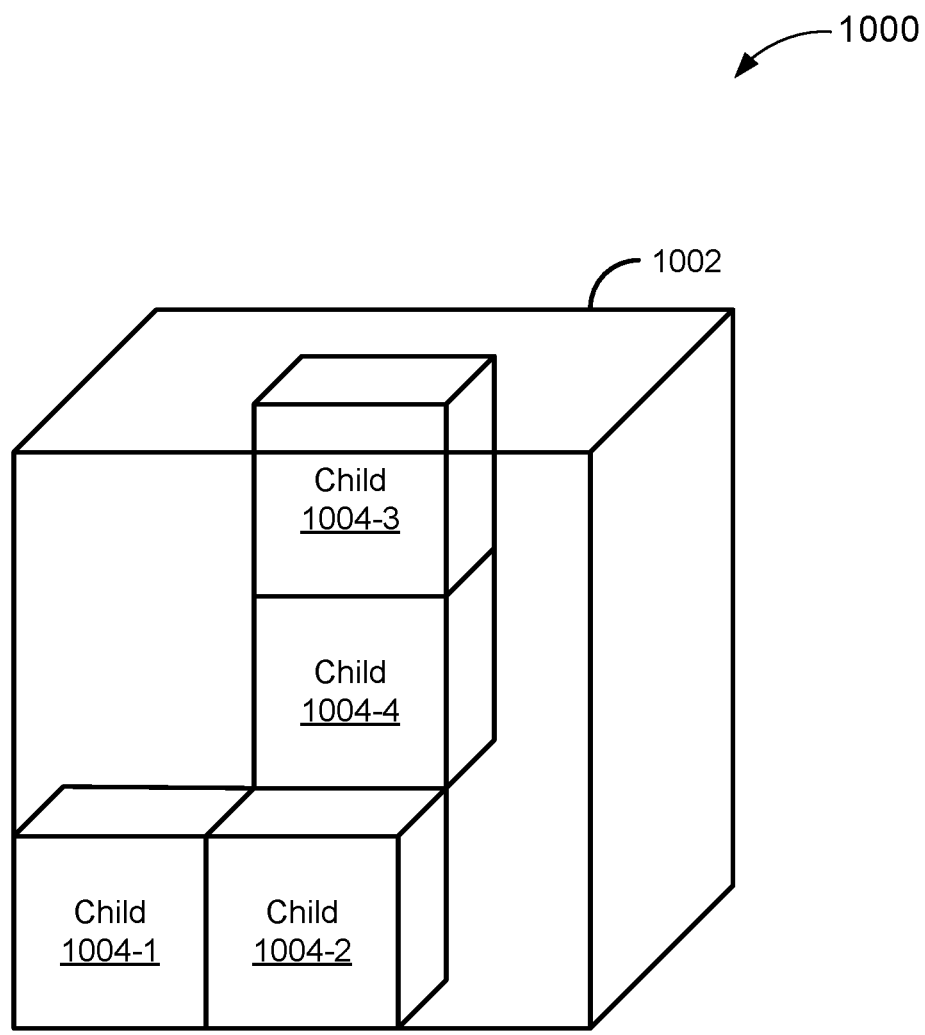
FIG. 10 depicts a diagram of child AVR objects added to a parent AVR object.

FIG. 10 depicts a diagram 1000 of child AVR objects added to a parent AVR object. The diagram 1000 includes a parent AVR object 1002 and child AVR objects 1004-1 to 1004-4 (collectively, the child AVR objects 1004). For illustrative purposes, the parent AVR object 1002 has 3 identifiable planes and 9 identifiable quadrants drawn out in 3D space with child AVR objects 1004 addAligned to the inside of the parent AVR object 1002. To accomplish the goal of the child AVR objects being aligned inside the parent AVR object 1002, parameters associated with the specific implementation described in association with FIG. 10 include an alignment parameter of "position.alignment.in," where "in" designates the alignment of the respective child AVR objects 1004. The parameters for plane and point are either "position.plane.front" (for child AVR objects 1004-1 and 1004-2) or "position.plane.middle" (for child AVR objects 1004-3 and 1004-4). To demonstrate the advantageous capability of generating lists off of any point in 3D space, some alternative values for "position.point.x" are discussed, where 'x' can alternatively be bottom left, bottom center, top center, or center.

For illustrative purposes, the child AVR object 1004-1 is placed first. The positional parameters of the child AVR object 1004-1 are position.plane.front to indicate the object is to be placed in the front plane of the parent AVR object 1002, position.point.bottomleft to indicate the object is to be placed in the lower left quadrant of the selected plane, and position.alignment.in to indicate the object is to be placed inside the parent AVR object 1002.

For illustrative purposes, the child AVR object 1004-2 is placed second. The positional parameters of the child AVR object 1004-2 are position.plane.front and position.alignment.in, as described with reference to the child AVR object 1004-1. However, the point parameter could be either position.point.bottomcenter (which would place the child AVR object 1004-2 next to the child AVR object 1004-1) or position.point.bottomleft (which would place the child AVR object 1004-2 in the same space as the child AVR object 1004-1). In this specific implementation, in the latter case, where the child AVR object 1004-2 has the same positional parameters as the child AVR object 1004-1, an AVR object positioning engine (such as the AVR object positioning engine 912) shifts the child AVR object 1004-2 to the right to the next available position. Advantageously, this means an AVR object list can be created starting at any of the 27 locations inside (and as discussed in a moment, outside) of the parent AVR object 1002. Depending upon implementation- or configuration-specific factors, the rules regarding where to shift an object added to a list can be varied to cause child objects to shift in a desired direction.

For illustrative purposes, the child AVR object 1004-3 is placed third. The positional parameters of the child AVR object 1004-3 are position.plane.middle to indicate the object is to be placed in the middle plane of the parent AVR object 1002, position.point.topcenter to indicate the object is to be placed in the upper central quadrant of the selected plane, and position.alignment.in to indicate the object is to be placed inside the parent AVR object 1002.

For illustrative purposes, the child AVR object 1004-4 is placed fourth. The positional parameters of the child AVR object 1004-4 are position.plane.middle and position.alignment.in, as described with reference to the child AVR object 1004-3. However, the point parameter could be either position.point.center (which would place the child AVR object 1004-4 below the child AVR object 1004-3) or position.point.topcenter (which would place the child AVR object 1004-4 in the same space as the child AVR object 1004-3). In this specific implementation, in the latter case, where the child AVR object 1004-4 has the same positional parameters as the child AVR object 904-3, an AVR object positioning engine (such as the AVR object positioning engine 912) shifts the child AVR object 1004-4 down to the next available position.

Figure 11:
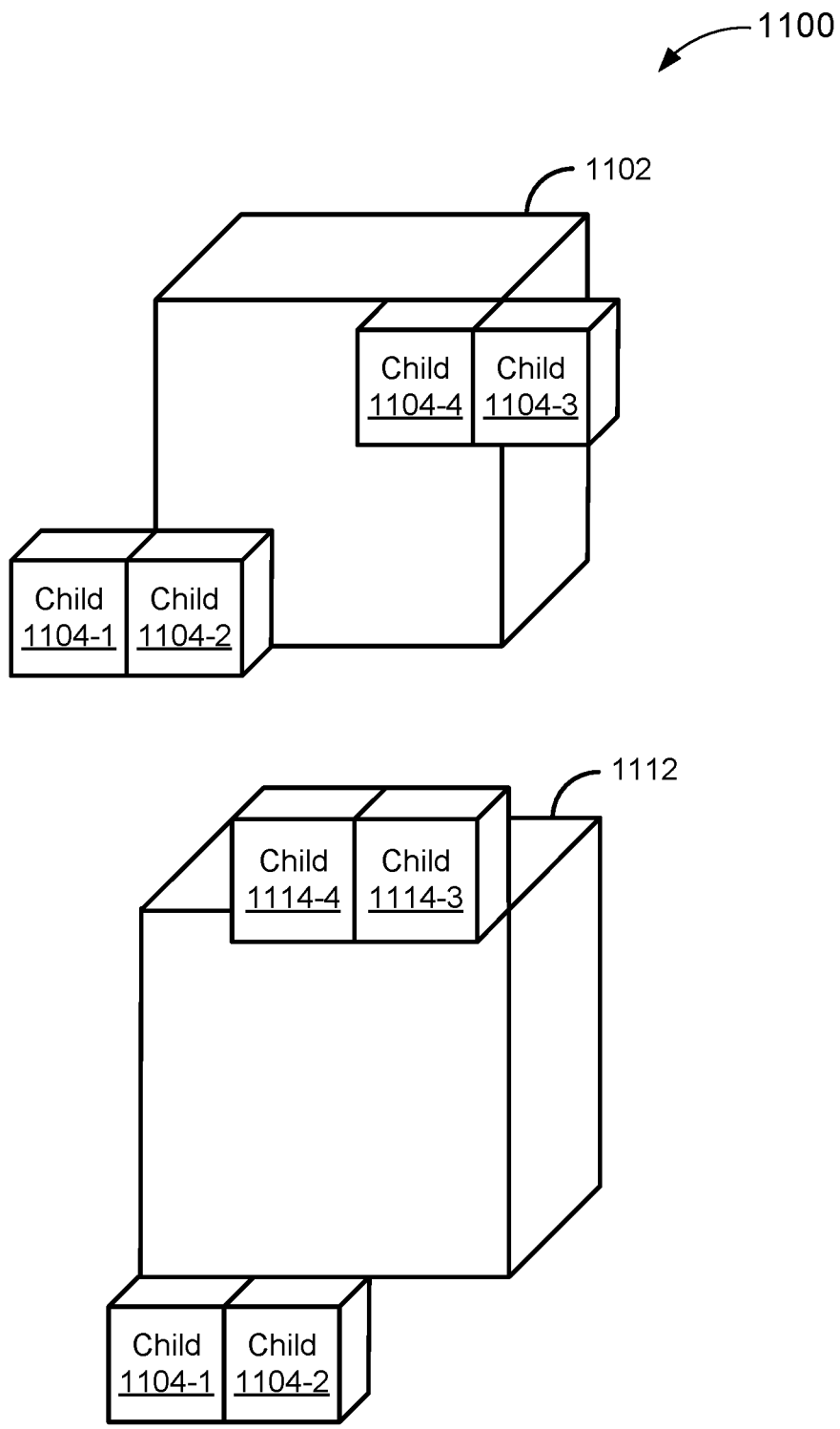
FIG. 11 depicts diagram of AVR child objects with different alignments.

FIG. 11 depicts diagram 1100 of AVR child objects with different alignments. FIG. 11 does not illustrate the "in" alignment, which was described above with reference to FIG. 10. The diagram 1100 includes a parent AVR object 1102 with AVR children 1104 (individually, AVR child 1104-1 to 1104-4) and a parent AVR object 1112 with AVR children 1114 (individually, AVR child 1114-1 to 1114-4).

For illustrative purposes, the child AVR object 1104-1 is placed first. The positional parameters of the child AVR object 1104-1 are position.plane.front to indicate the object is to be placed in the front plane of the parent AVR object 1102, position.point.bottomleft to indicate the object is to be placed in the lower left quadrant of the selected plane, and position.alignment.outhorizontal to indicate the object is to be placed outside the parent AVR object 1102 and shifted to the left (horizontally).

For illustrative purposes, the child AVR object 1104-2 is placed second. The positional parameters of the child AVR object 1104-2 are position.plane.front and position.alignment.outhorizontal, as described with reference to the child AVR object 1104-1. However, the point parameter could be either position.point.bottomcenter (which would place the child AVR object 1104-2 next to the child AVR object 1104-1) or position.point.bottomleft (which would place the child AVR object 1104-2 in the same space as the child AVR object 1104-1). In this specific implementation, in the latter case, where the child AVR object 1104-2 has the same positional parameters as the child AVR object 1104-1, an AVR object positioning engine (such as the AVR object positioning engine 912) shifts the child AVR object 1104-2 to the right to the next available position. Advantageously, this means an AVR object list can be created starting at a number of positions outside of the parent AVR object 1102. Depending upon implementation- or configuration-specific factors, the rules regarding where to shift an object added to a list can be varied to cause child objects to shift in a desired direction.

For illustrative purposes, the child AVR object 1104-3 is placed third. The positional parameters of the child AVR object 1104-3 are position.plane.front to indicate the object is to be placed in the front plane of the parent AVR object 1102, position.point.topright to indicate the object is to be placed in the upper right quadrant of the selected plane, and position.alignment.outhorizontal to indicate the object is to be placed outside the parent AVR object 1102 and shifted to the right (horizontally).

For illustrative purposes, the child AVR object 1104-4 is placed fourth. The positional parameters of the child AVR object 1104-4 are position.plane.front and position.alignment.outhorizontal, as described with reference to the child AVR object 1104-3. However, the point parameter could be either position.point.topcenter (which would place the child AVR object 1104-4 below the child AVR object 1104-3) or position.point.topright (which would place the child AVR object 1104-4 in the same space as the child AVR object 1104-3). In this specific implementation, in the latter case, where the child AVR object 1104-4 has the same positional parameters as the child AVR object 1104-3, an AVR object positioning engine (such as the AVR object positioning engine 912) shifts the child AVR object 1104-4 left to the next available position.

Starting the count over with reference to parent AVR object 1112, for illustrative purposes, the child AVR object 1114-1 is placed first. The positional parameters of the child AVR object 1114-1 are position.plane.front to indicate the object is to be placed in the front plane of the parent AVR object 1112, position.point.bottomleft to indicate the object is to be placed in the lower left quadrant of the selected plane, and position.alignment.outvertical to indicate the object is to be placed outside the parent AVR object 1112 and shifted downward (vertically).

For illustrative purposes, the child AVR object 1114-2 is placed second. The positional parameters of the child AVR object 1114-2 are position.plane.front and position.alignment.outvertical, as described with reference to the child AVR object 1114-1. However, the point parameter could be either position.point.bottomcenter (which would place the child AVR object 1114-2 next to the child AVR object 1114-1) or position.point.bottomleft (which would place the child AVR object 1114-2 in the same space as the child AVR object 1114-1). In this specific implementation, in the latter case, where the child AVR object 1114-2 has the same positional parameters as the child AVR object 1114-1, an AVR object positioning engine (such as the AVR object positioning engine 912) shifts the child AVR object 1114-2 to the right to the next available position. Advantageously, this means an AVR object list can be created starting at a number of positions outside of the parent AVR object 1112. Depending upon implementation- or configuration-specific factors, the rules regarding where to shift an object added to a list can be varied to cause child objects to shift in a desired direction.

For illustrative purposes, the child AVR object 1114-3 is placed third. The positional parameters of the child AVR object 1114-3 are position.plane.front to indicate the object is to be placed in the front plane of the parent AVR object 1112, position.point.topright to indicate the object is to be placed in the upper right quadrant of the selected plane, and position.alignment.outvertical to indicate the object is to be placed outside the parent AVR object 1112 and shifted to the upward (vertically).

For illustrative purposes, the child AVR object 1114-4 is placed fourth. The positional parameters of the child AVR object 1114-4 are position.plane.front and position.alignment.outvertical, as described with reference to the child AVR object 1114-3. However, the point parameter could be either position.point.topcenter (which would place the child AVR object 1114-4 below the child AVR object 1114-3) or position.point.topright (which would place the child AVR object 1114-4 in the same space as the child AVR object 1114-3). In this specific implementation, in the latter case, where the child AVR object 1114-4 has the same positional parameters as the child AVR object 1114-3, an AVR object positioning engine (such as the AVR object positioning engine 912) shifts the child AVR object 1114-4 right to the next available position.

Although the specific implementation assumes a cubic representation with 3 planes of 9 "points" for a total of 27 positions inside an AVR parent object, it should be understood some other number of planes and "points" can be implemented instead without deviating from the pertinent teachings in this paper. Although the specific implementation assumes three alignments (in, out horizontal, and out vertical), there are a total of 90 positions adjacent to an edge of a unit cube within a parent AVR object (and 98 positions that are adjacent to at least a corner of a unit cube). Some convention other than out horizontal and out vertical could be used to provide outer alignments that ensure all adjacent outer positions can be directly selected. For example, an exhaustive (though highly redundant) system could include position.alignment.n, where n has a value of 0 to indicate out without shift and a value of 1-8 to indicate out with a shift in one of 8 directions (left, right, up, down, up-left, up-right, down-left, and down-right).

In an alternative, second one or more objects aligned to a first object remain aligned when the first object is moved. Alternatively or in addition, second one or more objects can be aligned to a first object and centered on a third object. Using one or more of both of these techniques, it is possible to create a chain of interesting alignments (not simply a group), though it is also possible to group.

Referring once again to the example of FIG. 9, advantageously, the AVR object positioning engine 912 can take advantage of planes in 3D space. For example, planar axes can be revealed when it is useful to clarify data. In this way, pages (planes) of data can be interleaved with one another and presented so as to illustrate the existence of the pages.

In a specific implementation, the AVR object positioning engine 912 is configured to cause a plurality of AVR objects (e.g., an AVR parent object and one or more child AVR objects) to move synchronously and/or together when one of the AVR objects is moved during the positioning of the AVR objects. For example, when an AVR patent object is moved from an original position to a new position, the AVR object positioning engine 912 may cause one or more child AVR objects of the AVR patent object to move synchronously and/or together with the AVR patent object. As a result, a positional relationship among the plurality of AVR objects can be maintained even after move of the AVR patent object.

In a specific implementation, the AVR object positioning engine 912 is configured to cause a plurality of AVR objects positioned during the positioning to be presented as part of AVR media maintaining the relative positioning of the AVR objects. For example, when an AVR object included in an AVR media is moved during presentation of the AVR media, one or more other AVR objects associated with the moved AVR objects may be moved synchronously and/or together.

In the example of FIG. 9, the AVR flow control subsystem 906 is intended to represent multiple engines used to control the flow of an AVR media experience. In the diagram 900, the AVR flow control subsystem 906 includes a gaze guide control engine 914, a unity parser engine 816, and a playback platform engine 918.

In the example of FIG. 9, the gaze guide control engine 914 is intended to represent specifically-purposed hardware that implements rules for the placement AVR gaze guide objects at appropriate places in AVR media. For example, an AVR media author may determine a first AVR object must be viewed prior to playing audio associated with the first AVR object. To that end, an AVR gaze guide object may be rendered to direct an audience member's attention to the first AVR object. AVR gaze guide objects can be, for example, arrows that point in the direction of interest, thereby encouraging audience members to look in the indicated direction.

In the example of FIG. 9, the unity parser engine 916 is intended to represent specifically-purposed hardware that parses AVR data structures to render aspects or modules of an AVR media into a single experience. In a specific implementation, the unity parser engine 916 includes a declarative language, such as JSON, or markup language, such as HTML, that provides access to AVR objects and other applicable modules within the context of a single AVR media. In a specific implementation, the unity parser engine 916 includes an authoring tool for writing and editing the declarative language so end users need not see code, but rather can see a what-you-see-is-what-you-get (WSIWIG) interface. The declarative language used by the unity parser engine 916, along with media and data files, can be saved in a cloud-based datastore along with information describing AVR media (e.g., author, shared users, room definitions for multiuser, etc.) so that when a potential audience member selects AVR media from a server, all information is present that can load up and present scenes of the AVR media.

In a specific implementation, the unity parser engine 916 parses the elements of the declarative language creating objects and actions, with links to related media files, data files, conditional rules, or the like, to facilitate the creation of a complete AVR media experience. For example, where the AVR media is crafted from the sum total of all capabilities of an AVR media CRUD system (e.g., data visualizations, maps, diagrams, text, lines, iconography, photos, 360° photos, videos, 360° videos, buttons, layout systems, 3D models, narration, music, sound effects, and interaction control panels, to name several) the unity parser engine 916 has access to the language that is used to tie the various components together into one or a series of scenes. As such, a scene can be characterized as an "idea-space" that has enough information and interactivity to present a conceptual idea. Perhaps it is like a scene in a play: it gives the user a sense of a location and objects that exist in that location (just that the location is an idea-space instead of a reproduction of a real 3D space). In some implementations, the environment changes to alert audience members they have moved to another scene, and sometimes the objects rearrange so significantly that they can represent a new idea, and this would also be considered a scene.

In a specific embodiment, scenes are designed to last between 20 and 200 seconds, on average. The unity parser engine 916 has access to an AVR media comprising a list of scenes, within each of which is a list of AVR objects and action definitions. In a specific implementation, each AVR object and action is named to facilitate cross-referencing. For example, a button object will reference a named action definition and an action definition may act upon an object (e.g., start an animation, hide/show an object, etc.) and may also reference a named scene, so that it navigates to the new scene. Actions can also change FOV to zoom in or out of an AVR object or move through a potentially complex path through a scene.

As was discussed previously, a positioning system can be applied to AVR objects in scenes, which will dynamically lay out the AVR objects in position relative to other objects. Although the unity parser engine 916 could conceivably enter hard-coded positions, in a specific implementation, advantageously, objects are positioned relative to other objects without the need for an author or agent thereof to place objects with Cartesian (x,y,z) coordinates or by dragging objects into place in a graphical user interface (GUI).

In the example of FIG. 9, the playback platform engine 918 is intended to represent specifically-purposed hardware that enables configuration of AVR media in accordance with playback platform capabilities. It is often desirable to isolate an author (or users of computers in general) from lower layers, such as the physical layer. Accordingly, it is reasonably likely playback platform compliance will be addressed at some level using artificial agents. However, to the extent it is desirable, an author may have control over aspects of AVR media that depend upon the playback platform.

In the example of FIG. 9, the AVR media datastore 908 is intended to represent AVR media that is ready for playback. AVR media can be further modified to incorporate multiuser features, as is discussed next.

In the example of FIG. 9, the multiuser control subsystem 910 is intended to represent multiple engines used to add presentation, MR transition, and other multiuser functionality to AVR media. In the diagram 900, the multiuser control subsystem 910 includes a presentation control engine 920, an environmental MR transition engine 922, an avatar layout engine 924, and a multiuser access engine 926.

In the example of FIG. 9, the presentation control engine 920 is intended to represent specifically-purposed hardware that incorporates controls for a presenter in a multiuser context. Presentation controls can include the ability to slave audience members to a presenter. The degree of control a presenter has over audience member experience can include no-look-away, which prevents an audience member from turning their heads to render a new image; no-walk-away, which prevents an audience member from leaving a particular spot (but the audience member can still look around); and limited mobility, which forces an audience member to remain within a subset of a virtual space-time. No-walk-away and limited mobility may be accompanied by gaze guides, as discussed previously. Advantageously, audience members share a presenter's scene (or snap back to the presenter's scene if they wander away). Because all of the audience members are co-located, all of the audience members can share a preselected viewing location. The presenter may or may not share the same preselected viewing location. The presentation control engine 920 can also provide additional objects for a presenter in a belt panel, which was discussed previously.

In the example of FIG. 9, the environmental MR transition engine 922 is intended to represent specifically-purposed hardware that provides transitions between real world FOV and AVR FOV. Transitions can include blurring out a real world FOV to focus audience members on an AVR object, pushing a real world FOV back to make room for an AVR object, or some other mechanism for transitioning from a real world FOV to an AVR FOV. Transitions can also include blurring out an AVR FOV to focus audience members on a real world presentation, pushing an AVR FOV back to make room for a real world presentation, converting AVR objects to lines to signal transition to a real world FOV, or some other mechanism for transitioning from a real world FOV to an AVR FOV.

In the example of FIG. 9, the avatar layout engine 924 is intended to represent specifically-purposed hardware that provides rules for placement of avatars in a multiuser context. As has been mentioned, audience members can share a preselected primary viewing location. However, where audience members are aware of one another in a virtual context, it may be desirable to include avatars of audience members that are not co-located. To that end, without interfering with the subjective coordinate system that places each audience member at a preselected primary viewing location, the avatar layout engine 924 uses an objective coordinate system to place avatars associated with audience members (or to provide rules for placement at run-time). In a specific implementation, the avatars are placed in the same manner other AVR objects are placed within a scene. However, to the extent avatars have a head or other feature that enables an observer of the avatar to know in which direction the avatar is looking, the subjective viewing location of the audience member and the objective location of the avatar in the scene should be mathematically coordinated to orient the avatar's head (or analogous feature) in the direction of the audience member's camera FOV. A hand (or selector feature) should be similarly oriented.

In the example of FIG. 9, the multiuser access engine 926 is intended to represent a specifically-purposed hardware that controls multiuser access to AVR media. The subjective coordinate system provides a mechanism through which audience members can collaborate more effectively than when audience members have a different vantage point to a scene necessitated by objective coordinate systems in which audience members do not share a primary vantage point.

An AVR media author or agent thereof can generally create AVR media and playback the AVR media as desired. Such AVR media can be shared with individuals or agents thereof for playback in a similar manner. When AVR media is played back in this manner, it is typically a single-user experience. An alternative is to provide a room in which AVR media can unfold in virtual space-time for any audience members that are permitted access to the room. As such, as used in this paper, a room is a virtual space in which an audience member can experience a presentation by a presenter or master (a first type of multiuser) or audience members can share an AVR media experience without a presenter or master (a second type of multiuser). It may be noted a single-user experience can also unfold within a room, which can be useful for debugging of multiuser by an author or agent thereof, or a room may be necessitated by implementation- or configuration-specific factors.

AVR media in the AVR media datastore 908 can be made accessible via a URL. When AVR media is selected a room is created in which to play self-contained AVR media. The room may or may not be password protected. In a specific implementation, a playback device can be given access to authored, shared, or other AVR media to which authorization has been granted such that the playback device can select an AVR media for playback in the room. It may be noted the multiuser access engine 826 may be available to an author to set multiuser access parameters or to a distributor that has obtained AVR media from authors and has the right to set multiuser access parameters (e.g., by enabling login to a website with a username and password).

In a specific implementation, the multiuser access engine 926 has information about audience members, which can include demographic, geographic, psychographic, behavioristic, or other information. Certain AVR objects may be rendered for audience members with appropriate characteristics. For example, an AVR data object may be presented in English for a demographic that speaks English, a geographic that places the audience member in the U.S., a psychographic that indicates great interest in English learning, or a behavioristic that indicates the audience member has viewed websites in English; and may be presented in Chinese if determined to be appropriate for an audience member. (This functionality could also be implemented, in whole or in part, in an AVR object creation engine, such as the AVR object creation engine 304.) AVR data objects can also be dynamic in the sense that they render differently depending upon the demographic, geographic, psychographic, behavioristic, or other characteristics of audience members.

Figure 12:
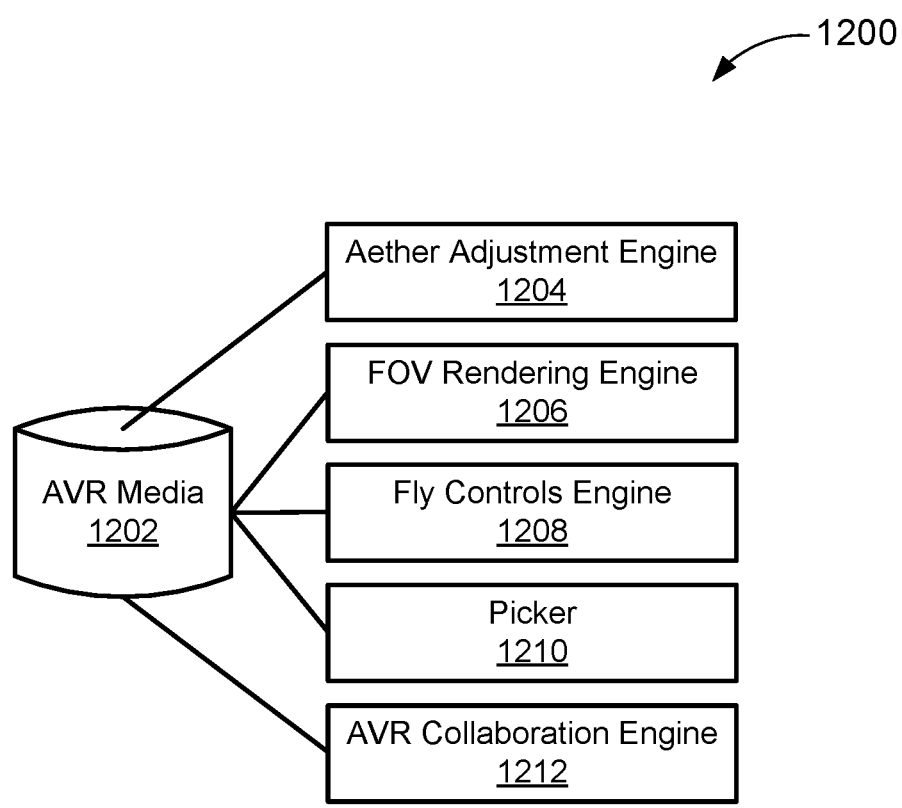
FIG. 12 depicts a diagram of an example of an AVR media playback system.

FIG. 12 depicts a diagram 1200 of an example of an AVR media playback system. The diagram 1200 includes an AVR media datastore 1202, an aether adjustment engine 1204, an FOV rendering engine 1206, a fly controls engine 1208, a picker 1210, and an AVR collaboration engine. The AVR media datastore 1202 is coupled to the aether adjustment engine 1204, the FOV rendering engine 1206, the fly controls engine 1208, the picker 1210, and the AVR collaboration engine 1212.

In the example of FIG. 12, the AVR media datastore 1202 is intended to represent AVR media that is ready for playback. AVR media can be further modified to incorporate multiuser features, as is discussed next.

In the example of FIG. 12, the aether adjustment engine 1204 is intended to represent specifically-purposed hardware that changes aether objects in accordance with audience member preferences. Advantageously, an audience member who feels the need for more grounding or who is more prone to motion sickness can adjust the size and/or unit distance between aether objects to a configuration that improves grounding and is less prone to cause motion sickness. Audience members who are less prone to motion sickness may choose to decrease aether object size and/or density or remove the aether objects from their FOV entirely.

In the example of FIG. 12, the FOV rendering engine 1206 is intended to represent specifically-purposed hardware that renders FOV of AVR media based upon a virtual camera position of an audience member. In a specific implementation, the FOV rendering engine 1206 is installed on a playback device. In an alternative, the FOV rendering engine 1206 is partially installed on a playback device. In yet another alternative, the FOV rendering engine 1206 is executed remotely from a playback device and the resultant FOV is provided to the playback device. (It may be noted, in the alternatives, the playback device could be characterized as two or more devices relatively remote to one another, but for illustrative purposes it is generally assumed in this paper that the playback device at least includes an AVR media playback component that is worn or otherwise placed in close proximity to an audience member.)

In the example of FIG. 12, the fly controls engine 1208 is intended to represent specifically-purposed hardware that provides fly controls for a playback device that is playing back AVR media. Fly controls enable an audience member positioned at a primary vantage point (in the "center" of, e.g., AVR data objects), with data potentially moving around the audience member, to move through the various, e.g., AVR data objects. The amount of fly control varies depending upon implementation- or configuration-specific factors, but can include an autopilot that forces an audience member along a predefined path, a linear path that the audience member can speed up or slow down, a linear path with options for an audience member to leave the path for a time, a nonlinear path that allows for detours or branching, or even a sandbox.

In the example of FIG. 12, the picker 1210 is intended to represent specifically-purposed hardware that targets and selects objects or locations within a virtual space-time. In a specific implementation, the targeted object or location is identified with a cursor or pointer icon that moves in a manner that is implementation- or configuration-specific. For example, an audience member could move a handheld device, mouse, or other input device to move the cursor within the virtual space-time. Alternatively or in addition, targeting could be for whatever location is in the center of a FOV such that when an audience member turns to look at an object or location, that object or location is automatically targeted. It may be noted a 3D environment may or may not make a 3D targeting mechanism desirable, such as a mouse that targets any portion of an FOV and a wheel that sets distances. In a specific implementation, the targeted object or location is selectable with an event. The event can include a click of a physical button, a verbal command, an amount of time passing with the same object or location targeted, or the like. When an object or location is picked, an action takes place that can depend upon rules associated with the object or in accordance with object-independent rules for picking objects or locations.

In the example of FIG. 12, the AVR collaboration engine 1212 is intended to represent specifically-purposed hardware that facilitates collaboration. In a specific implementation, the AVR collaboration engine 1212 stores objects, scenes, or scene trees for sharing or remixing. Depending upon implementation- or configuration-specific factors, the AVR collaboration engine 1212 may also CRUD editable objects within an AVR media (and control CRUD rights, if applicable), which other audience members can edit if they have the appropriate rights. Advantageously, collaboration can be organized using object metadata (timestamp, GPS, etc.) to locate objects in an appropriate virtual space-time. In addition, objects can have virtual metadata associated with a virtual space-time that gives additional organizational control, thereby improving collaboration.

Figure 13:
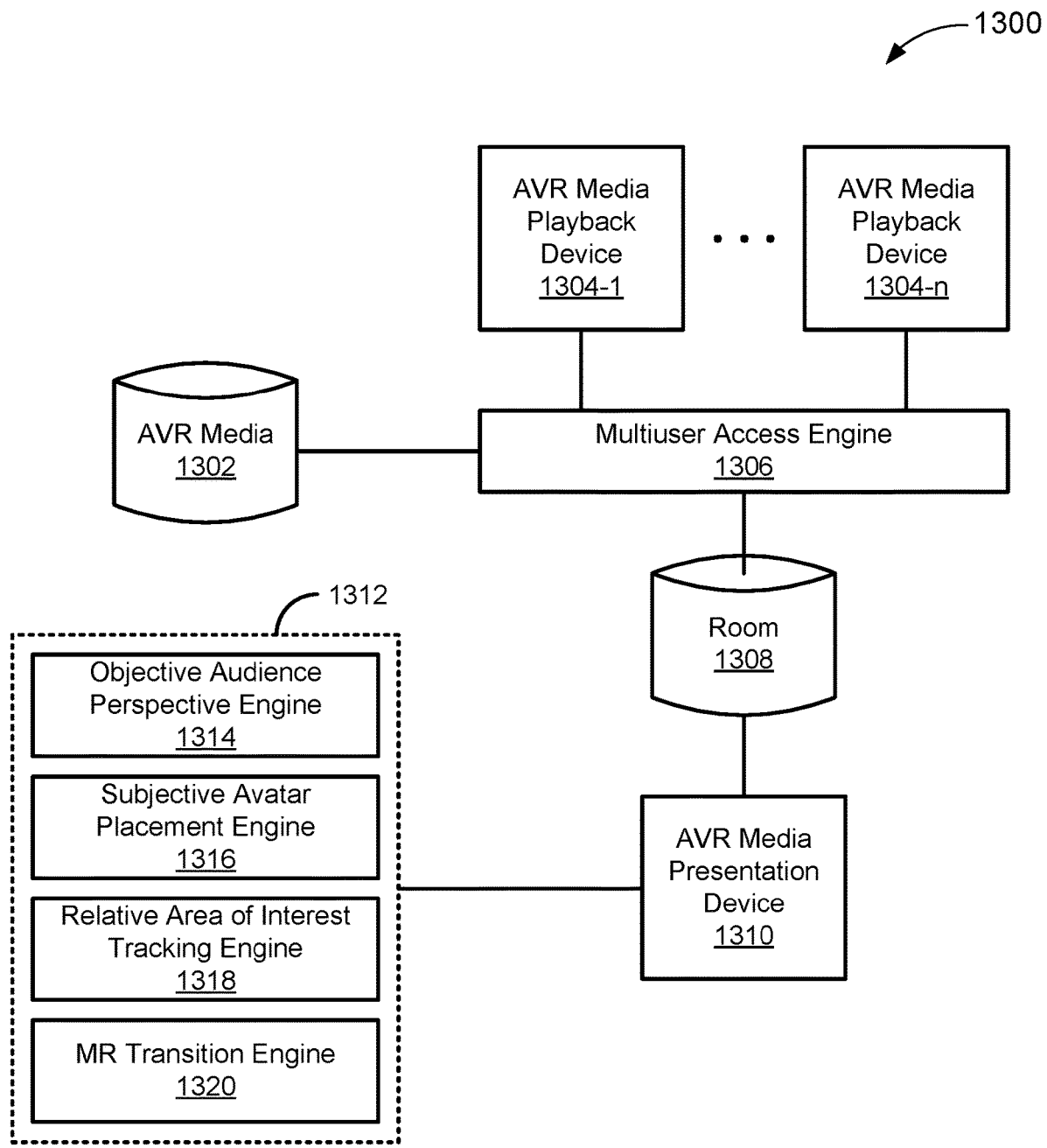
FIG. 13 depicts a diagram of an example of an AVR multiuser access system.

FIG. 13 depicts a diagram 1300 of an example of an AVR multiuser access system. The diagram 1300 includes an AVR media datastore 1302, an AVR media playback device 1304-1 to 1304-n (collectively, AVR media playback devices 1304), a multiuser access engine 1306, a room datastore 1308, an AVR media presentation device 1310, and an AVR presentation control engine 1312. The multiuser access engine 1306 is coupled to the AVR media datastore 1302, the AVR media playback devices 1304, and the room datastore 1308; the AVR media presentation device 1310 is coupled to the room datastore 1308 and the AVR presentation control engine 1312.

In the example of FIG. 13, the AVR media datastore 1302 is intended to represent AVR media that is ready for playback. AVR media can be further modified to incorporate multiuser features, as is discussed next.

In the example of FIG. 13, the AVR media playback devices 1304 are intended to represent devices that can play back AVR media in the AVR media datastore 1302.

In the example of FIG. 13, the multiuser access engine 1306 is intended to represent specifically-purposed hardware that gives the AVR media playback devices 1304 access to AVR media in the AVR media datastore 1302 in a multiuser context. In a specific implementation, AVR media can be self-contained for use in a non-multiuser context or a multiuser context. Depending upon implementation- or configuration-specific factors, playback of AVR media in a multiuser context (or at all) can require login (e.g., entry of an extant username and valid password). When AVR media is opened in a multiuser context (even if it is opened first by a single audience member prior to any other audience members joining), the AVR media can be characterized as playing in a "room."

In a specific implementation, the multiuser access engine 1306 is configured to manage a value of a counter (e.g., karma) associated with popularity of an AVR media and/or an AVR media author. For example, the multiuser access engine 1306 is configured to increase the value of the counter in response to an upvote for an AVR media and/or an AVR media author, and decrease the value of the counter in response to an downvote against an AVR media and/or an AVR media author. In another example, the multiuser access engine 1306 is configured to increase the value of the counter in response to either an upvote or downvote for an AVR media and/or an AVR media author. Depending upon implementation- or configuration-specific factors, the multiuser access engine 1306 may restrict and/or prevent creation of a new AVR media with respect to an AVR media author associated with the counter. In another example, the multiuser access engine 1306 may be configured to manage a value of a counter corresponding to view popularity of an AVR media. For example, the multiuser access engine 1306 may be configured to cumulatively increase the value of the counter based on user access to the corresponding AVR media for viewing, and manage privilege of an AVR media author associated with the AVR media.

In a specific implementation, the multiuser access engine 1306 is configured to manage attributes to an AVR media, one or more AVR objects included in the AVR media, and one or more pieces of raw data, symbols and media data to track provenance of datasets resulted in the AVR media. In a specific implementation, in tracking provenance of datasets, a blockchain technique may be employed. For example, datasets may each include some attribute date associated with an author and/or datasource thereof, and, for generation of a new dataset, a dataset of a previous generation or any applicable function of the dataset of the previous generation may be used to encrypt the new dataset. By referring back to a dataset (e.g., AVR media) to the initial generation of datasets, it is possible to obtain the attribute to each dataset involved in an AVR media, which can further lead to more reliable and truthful AVR media.

In a specific implementation, the multiuser access engine 1306 is configured to provide and manage a credit for a dataset involved in an AVR media. For example, the multiuser access engine 1306 may reward authors and/or datasources of datasets involved in an AVR media to facilitate creation of AVR media. Depending upon implementation- or configuration-specific factors, the credit may be based on real currency, virtual currency (e.g., cryptocurrency), and/or local credit dedicated for a system for presenting AVR media. For rewarding, the multiuser access engine 1306 may be also configured to provide and manage payment from viewers accessing AVR media.

In a specific implementation, the multiuser access engine 1306 is configured to manage inappropriate contents included in AVR media, by employing a blockchain technique. For example, once an inappropriate content (e.g., child porn) is found in an AVR media, the multiuser access engine 1306 may prohibit access to one or more AVR media that includes one or more datasets that can refer back to the inappropriate content through the blockchain of cryptography. In managing the blockchain, the multiuser access engine 1306 may manage blockchain addresses of datasets in a database. To track provenance of datasets involved in an AVR media, text data may be too cumbersome. In such a case, plasma or a similar technology may be employed to group multiple chains of datasets and batch text data with respect to the grouped multiple chains of datasets. Instead of or in addition to the blockchain technique, IOTA built based on Tangle may be employed.

In the example of FIG. 13, the room datastore 1308 is intended to represent state and other data associated with a room in which AVR media is playing. State can include AVR media state, room state, audience member state, and presenter state. Depending upon implementation- or configuration-specific factors, audience members and presenters might have very similar state (with potentially the only difference being a flag indicating a first audience member is the current presenter).

In the example of FIG. 13, the AVR media presentation device 1310 is intended to represent a device used by a presenter, master, or superuser who is distinguishable from other audience members due to access to additional controls. In a specific implementation, multiuser does not necessitate the existence of a presenter, master, or superuser, making the AVR media presentation device 1310 optional. Depending upon implementation- or configuration-specific factors, the AVR media presentation device 1310 may be similar to the AVR media device playback devices 1304. Indeed, if presentation control can be passed from a first audience member to a second audience member either with changes to the room or over time, the AVR media presentation device 1310 may be indistinguishable from the AVR media device playback devices 1304 (potentially ignoring differences related to the AVR media presentation device 1310 having access to the AVR presentation control engine 1312 for illustrative purposes). Although the AVR media presentation device 1310 is depicted as being coupled to the multiuser access engine 1306, in a specific implementation, a presenter may or may not need to access AVR media via the multiuser access engine 1306 the same as, or similar to, other audience members.

In the example of FIG. 13, the AVR presentation control engine 1312 is intended to represent specifically-purposed hardware that provides multiuser control over AVR media to a human or artificial presenter, master, or superuser, or human or artificial agents thereof. For illustrative purposes, the AVR presentation control engine 1312 is separate from the AVR media presentation device 1310, but the AVR presentation control engine 1312 could be implemented in whole or in part on the AVR media presentation device 1310.

In the diagram 1300, the AVR presentation control engine 1312 includes an objective audience perspective engine 1314, a subjective avatar placement engine 1316, a relative area of interest tracking engine 1318, and a mixed reality transition engine 1320. In the example of FIG. 13, the objective audience perspective engine 1314 is intended to represent specifically-purposed hardware that causes a subset of audience members for an AVR media presentation associated with the room datastore 1308 to have co-located virtual camera home coordinates. The subset may or may not include all of the audience members. Depending upon implementation- or configuration-specific factors, the co-located virtual camera home coordination can be further augmented with gaze guides for the audience members to be made aware of a suggested orientation. (Orientation can also be adjusted with a snap-to-preferred-orientation command.)

In the example of FIG. 13, the subjective avatar placement engine 1316 is intended to represent specifically-purposed hardware that causes audience member FOVs to include avatars of audience members who are not co-located (despite objective audience perspective) from the perspective of other audience members. The subjective avatar placement engine 1316 maintains the subjective placement by performing a translation when an audience member associated with an avatar changes position, the subjective placement within the AVR media presentation retains the same offset relative to the scene for other audience members. The subjective avatar placement engine 1316 can also change relative placements, if desired, such as when new audience members join and "push other avatars out of the way." In a specific implementation, each audience member has an offset from home that remains consistent unless reassigned, which can entail teleporting an avatar or shifting the avatar in a more subtle fashion, such as by making an avatar walk to its new offset location.

In the example of FIG. 13, the relative area of interest tracking engine 1318 is intended to represent specifically-purposed hardware that tracks where audience members are directing their attention. Tracking can include coordinate tracking (e.g., tracking where an audience member moves within a scene), FOV tracking (e.g., tracking what is rendered for an audience member), eye tracking (e.g., tracking what an audience member is looking at within an FOV using eye tracking technology), or event tracking (e.g., tracking where an audience member places a cursor within an FOV). For rendering avatars, FOV tracking can be associated with the orientation of a head or analogous avatar portion and event tracking can be associated with pointing using a limb or analogous avatar portion. In a specific implementation, the relative area of interest tracking engine 1318 can control scene tree branching by providing an area of interest tracking data to the AVR media presentation device 1310, which selects a conditional branch based upon area of interest.

In the example of FIG. 13, the mixed reality transition engine 1320 is intended to represent specifically-purposed hardware that transitions between AVR and real world. Applicable techniques include blurring some or all of a real or virtual FOV to focus attention on other content, pushing some or all of a real or virtual FOV back to make room for other content, converting some or all of a real or virtual FOV into line drawings to make other content stand out. Depending upon implementation- or configuration-specific factors, real world can be a reference to unaugmented reality (e.g., the mixed reality transition signals audience members to remove their headsets) or AR (e.g., the AVR presentation is replaced with an AR presentation). Advantageously, the mixed reality transition engine 1320 makes the most of immersion (a VR and AVR strength) and collaboration (an AR strength).

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

The invention claimed is:

1. A method comprising:
converting real world data into one or more augmented virtual reality (AVR) objects;
enhancing the one or more AVR objects to include at least one of processed data visualization and multiuser controls;
positioning the enhanced one or more AVR objects in a virtual space-time;
making available, as AVR media, a scene tree including the virtual space-time in which the enhanced one or more AVR objects are positioned;
applying a skyscape to a boundary of the virtual space-time, the skyscape including features that do not change as an audience member of the AVR media moves toward or away from the boundary of the virtual space-time.

2. The method of claim 1, further comprising:
classifying the real world data into one of raw data, symbolic data, and media data;
when the real world data is raw data, spatializing an element included in the raw data, the spatialized elements being converted into the one or more AVR objects;
when the real world data is symbolic data, formatting the symbolic data, the formatted symbolic data being converted into the one or more AVR objects; and
when the real world data is media data, formatting the media data, the formatted media data being converted into the one or more AVR objects.

3. The method of claim 1, wherein the enhancing the one or more AVR objects comprises animating at least one of the one or more AVR objects.

4. The method of claim 1, wherein the enhancing the one or more AVR objects comprises adding audio to at least one of the one or more AVR objects.

5. The method of claim 1, wherein the enhancing the one or more AVR objects comprises modifying a belt panel associated with the AVR media.

6. The method of claim 1, wherein the enhancing the one or more AVR objects comprises adding a mixed reality (MR) transition functionality to the AVR media.

7. The method of claim 1, wherein the enhancing the one or more AVR objects comprises adding interactivity to at least one of the one or more AVR objects, the interactivity including at least one of an AVR button, an AVR dialog, and an AVR timeline.

8. The method of claim 1, wherein a plurality of the enhanced AVR objects are positioned in the virtual space-time, the method further comprising causing the plurality of the enhanced AVR objects to move synchronously when the AVR media is presented.

9. The method of claim 1, further comprising facilitating access to the AVR media by multiusers.

10. The method of claim 9, wherein the facilitating access to the AVR media by multiusers comprises at least one of:
- causing audience members of the AVR media to have co-located virtual camera home coordinates; and
- causing a field of view (FOV) of audience members to include avatars of the audience members.

11. A system comprising:
- an augmented virtual reality (AVR) object creation engine configured to convert real world data into one or more AVR objects;
- an AVR object enhancement engine configured to enhance the one or more AVR objects to include processed data visualization and multiuser controls;
- an AVR object positioning engine configured to position the enhanced one or more AVR objects in a virtual space-time;
- an AVR media authoring engine configured to make available, as AVR media, a scene tree including the virtual space-time in which the enhanced one or more AVR objects are positioned;
- the AVR object positioning engine being further configured to apply a skyscape to a boundary of the virtual space-time, the skyscape including features that do not change as an audience member of the AVR media moves toward or away from the boundary of the virtual space-time.

12. The system of claim 11, wherein the AVR object creation engine is further configured to:
- classify the real world data into one of raw data, symbolic data, and media data;
- when the real world data is raw data, spatialize an element included in the raw data, the spatialized elements being converted into the one or more AVR objects;
- when the real world data is symbolic data, format the symbolic data, the formatted symbolic data being converted into the one or more AVR objects; and
- when the real world data is media data, format the media data, the formatted media data being converted into the one or more AVR objects.

13. The system of claim 11, wherein the AVR object enhancement engine is configured to enhance the one or more AVR objects by animating at least one of the one or more AVR objects.

14. The system of claim 11, wherein the AVR object enhancement engine is configured to enhance the one or more AVR objects by adding audio to at least one of the one or more AVR objects.

15. The system of claim 11, wherein the AVR object enhancement engine is configured to enhance the one or more AVR objects by modifying a belt panel associated with the AVR media.

16. The system of claim 11, wherein the AVR object enhancement engine is configured to enhance the one or more AVR objects by adding a mixed reality (MR) transition functionality to the AVR media.

17. The system of claim 11, wherein the AVR object enhancement engine is configured to enhance the one or more AVR objects by adding interactivity to at least one of the one or more AVR objects, the interactivity including at least one of an AVR button, an AVR dialog, and an AVR timeline.

18. The system of claim 11, wherein the AVR object positioning engine is configured to position a plurality of the enhanced AVR objects in the virtual space-time, and cause the plurality of the enhanced AVR objects to move synchronously when the AVR media is presented.

19. The system of claim 11, further comprising an AVR multiuser access engine configured to facilitate access to the AVR media by multiusers by at least one of:
- causing audience members of the AVR media to have co-located virtual camera home coordinates; and
- causing a field of view (FOV) of audience members to include avatars of the audience members.

20. A system comprising:
- a means for converting real world data into one or more augmented virtual reality (AVR) objects;
- a means for enhancing the one or more AVR objects to include processed data visualization and multiuser controls;
- a means for positioning the enhanced one or more AVR objects in a virtual space-time;
- a means for making available, as AVR media, a scene tree including the virtual space-time in which the enhanced one or more AVR objects are positioned;
- a means for applying a skyscape to a boundary of the virtual space-time, the skyscape including features that do not change as an audience member of the AVR media moves toward or away from the boundary of the virtual space-time.

* * * * *